(12) United States Patent
Nomura et al.

(10) Patent No.: US 7,054,253 B1
(45) Date of Patent: May 30, 2006

(54) OPTICAL HEAD

(75) Inventors: Takuji Nomura, Kanagawa (JP); Koichi Murata, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 930 days.

(21) Appl. No.: 09/830,849

(22) PCT Filed: Aug. 30, 2000

(86) PCT No.: PCT/JP00/05889

§ 371 (c)(1),
(2), (4) Date: Jul. 31, 2001

(87) PCT Pub. No.: WO01/18801

PCT Pub. Date: Mar. 15, 2001

(30) Foreign Application Priority Data

Sep. 2, 1999 (JP) .................................. 11-249285
Jun. 29, 2000 (JP) ............................ 2000-196926
Aug. 14, 2000 (JP) ............................ 2000-245457

(51) Int. Cl.
*G11B 7/135* (2006.01)
(52) U.S. Cl. .............................. 369/112.02; 369/110.01
(58) Field of Classification Search ............ 369/112.02
See application file for complete search history.

(56) References Cited

U.S. PATENT DOCUMENTS

| 4,127,322 | A | * | 11/1978 | Jacobson et al. ............. 353/31 |
| 5,084,777 | A | * | 1/1992 | Slobodin ..................... 349/27 |
| 5,594,565 | A | | 1/1997 | DeJule et al. |
| 5,594,713 | A | * | 1/1997 | Komma et al. .......... 369/44.23 |
| 5,859,818 | A | | 1/1999 | Tateishi et al. |
| 5,905,558 | A | * | 5/1999 | Tokunaga et al. ............ 349/149 |
| 6,480,454 | B1 | * | 11/2002 | Wada et al. ............ 369/112.02 |
| 2002/0105890 | A1 | * | 8/2002 | Ogasawara ............ 369/112.02 |
| 2004/0264347 | A1 | * | 12/2004 | Wada et al. ............ 369/112.02 |

FOREIGN PATENT DOCUMENTS

| EP | 1 011 009 | 6/2000 |
| JP | 62-170933 | 7/1987 |
| JP | 8-74033 | 3/1996 |
| JP | 08074033 A | * | 3/1996 |
| JP | 9-128785 | 5/1997 |
| JP | 10-188332 | 7/1998 |
| JP | 10188332 A | * | 7/1998 |
| JP | 10-221703 | 8/1998 |
| JP | 10-334491 | 12/1998 |
| JP | 11-110802 | 4/1999 |

OTHER PUBLICATIONS

Electronic translation of JP 10-188332.*
Electronic translation of JP 8-74033.*
Patent Abstracts of Japan, JP 10-221703, Aug. 21, 1998.

* cited by examiner

Primary Examiner—Hoa T. Nguyen
Assistant Examiner—Adam R. Giesy
(74) Attorney, Agent, or Firm—Oblon, Spivak, McClelland, Maier & Neustadt, P.C.

(57) ABSTRACT

An optical head device including a phase correcting element having an anisotropic optical medium sandwiched between a pair of substrates. The paired substrates have surfaces provided with electrodes for voltage application to the anisotropic optical medium. One electrode on at least one of the substrates has two or more power supply electrodes provided thereon at different positions, thereby providing different voltages to the respective power supply electrodes. The phase correcting element is provided between a collimating lens and a quarter wave plate in the optical head device.

18 Claims, 9 Drawing Sheets

DOTTED LINE:
  SPHERICAL
  ABERRATION
SOLID LINE:
  PHASE
  CORRECTING
  ELEMENT

◪ 100～200nm
☐ -100～100nm
◨ -200～-100nm

OBJECTIVE LENS NA: 0.6
DISC THICKNESS: 0.6 mm
DISC TILT ANGLE: 1 deg

OPTICAL HEAD

TECHNICAL FIELD

The present invention relates to an optical head device, which records and reproduces information on an optical recording medium, such as an optical disc.

BACKGROUND ART

Since a DVD as an optical disc has digital information recorded thereon in a high density in comparison with a CD as another optical disc, an optical head device for reproducing DVDs has the wavelength of a light source set at 650 nm or 635 nm shorter than 780 nm for CDs or the numerical aperture (NA) of an objective lens set at 0.6 greater than 0.45 for CDs, decreasing the spot size where the light converges on an optical disc surface.

In addition, it has been proposed that the wavelength of the light source be set about 400 nm and the NA be set at not less than 0.6 to obtain a greater recording density in the next generation of optical recording. However, a decrease in the wavelength of the light source or an increase in the NA of the objective lens causes an allowable amount in tilt caused by inclination of an optical disc surface with respect to a direction perpendicular to the optical axis or an allowable amount in thickness variations of an optical disc to decrease.

The reason why these allowable amounts decrease is that the generation of coma aberration for tilted optical discs or the generation of spherical aberration for thickness variations of optical discs degrades the light convergence properties of an optical head device to make reading of signals difficult. There have been proposed several methods for expanding the allowable amounts of optical head devices with respect to tilted optical discs or the thickness variations in case of high density recording.

One of the methods is one wherein the actuator for an objective lens which is usually movable in two axial directions of a tangential direction and a radial direction of an optical disc has an axis for inclination added therein to incline the objective lens in response to a detected tilt angle. However, this addition method creates problems in that the spherical aberration can not be corrected and the structure of the actuator is complicated, for instance.

Another method is one wherein a phase correcting element provided between an objective lens and a light source corrects spherical aberration. This correction method can expand the allowable amount in tilts or thickness variations of optical discs only by incorporation of the element into an optical head device without providing the actuator with significant modifications.

For example, there is JP-A-1020263 directed to the correction method wherein a phase correcting element is utilized to correct the tilt of optical discs. This is a method wherein voltages are applied to divided electrodes that are separately provided on each of a pair of substrates with a birefringent material, such as a liquid crystal, forming a phase correcting element sandwiched therewith, the substantial refractive index of the birefringent material is changed in response to the tilt angle of an optical disc, and the phase (wave front) change of transmitted light caused by the change in the refractive index corrects the coma aberration caused by the tilt of the optical disc.

The conventional phase correcting element requires that the electrodes on the phase correcting element be divided into plural segments, and the respective divided segments have different voltages as different control signals applied thereto in order to change the wave front of outgoing light from the light source to correct wave front aberration. For this reason, many electrodes, wires and external signal sources (power sources) are needed to obtain a desired form of wave front, creating problem in that the structure of the element is complicated, and the use of many external signal sources (power sources) makes the device troublesome. On the other hand, there has been a demand that the numbers of the electrodes, the wires and the external signal sources (power sources) be minimized.

It is difficult to provide a continuous change with a single electrode since the variation in the wave front is even on that electrode. In particular, it has been desired that regions having a great variation in wave front aberration, such as a peripheral portion in spherical aberration, be continuously changed. In addition, the regions between divided electrodes could cause a decrease in transmission rate of light due to, e.g., light scattering since no external signal can be applied to the regions. From these viewpoints, it has been desired that the number of the divided electrodes be minimized, and the number of the regions between the electrodes be minimized.

DISCLOSURE OF INVENTION

The present invention is provided to solve these problems and provides an optical head device characterized in that the device comprises a light source; an objective lens for converging outgoing light from the light source on an optical recording medium; a phase correcting element provided between the light source and the objective lens to change a wave front of the outgoing light, the phase correcting element including an anisotropic optical medium sandwiched between a pair of substrates, at least one of the substrates being transparent, the paired substrates having surfaces provided with electrodes for voltage application to the anisotropic optical medium, the electrode on at least one of the substrates having a plurality of power supply electrodes provided thereon at different positions, thereby providing different voltages to the plural power supply electrodes; and a control voltage generator for outputting a voltage for changing the wave front to the phase correcting element.

The present invention also provides an optical head device characterized in that the device comprises a light source; an objective lens for converging outgoing light from the light source on an optical recording medium; a phase correcting element provided between the light source and the objective lens to change a wave front of the outgoing light, the phase correcting element including an anisotropic optical medium sandwiched between a pair of substrates, the paired substrates having respective opposed surfaces provided with electrodes for voltage application to the anisotropic optical medium, the electrode on at least one of the substrates having a plurality of power supply electrodes provided thereon at different positions, not less than two of the plural power supply electrodes being conductively connected together through a thin film resistor comprising a conductive thin film; and a control voltage generator for outputting a voltage for changing the wave front to the phase correcting element.

The present invention also provides an optical head device, wherein an electrode with the power supply electrodes provided thereon is divided into a plurality of divided electrodes, the respective divided electrodes have more than one power supply electrode provided thereon, and not less than two of the power supply electrodes are conductively connected together through the thin film resistor.

The present invention also provides an optical head device, wherein the plural power supply electrodes are annular members and are concentrically provided each other, either one of the annular members has a radius ratio of 0.65–0.85 to luminous flux of the outgoing light starting from the light source and passing through the phase correcting element, and another annular member different from the annular member has a radius ratio of 0.2–0.4 to the luminous flux.

The present invention also provides an optical head device, wherein only one of the paired substrates is a transparent substrate.

The present invention also provides an optical head device, wherein the anisotropic optical medium is a liquid crystal.

The present invention also provides an optical head device, wherein an electrode material forming the electrodes with the power supply electrodes has a sheet resistance of not less than 100 $\Omega/\square$.

The present invention also provides an optical head device, wherein all thin film resistors have a value of resistance in a range from 100 $\Omega$ to 1000 k$\Omega$.

The present invention also provides an optical head device, wherein each electrode material forming the electrodes has a sheet resistance of not less than 1000 times a sheet resistance of a power supply electrode material forming the power supply electrodes.

The present invention also provides an optical head device, wherein the electrode material comprises a zinc oxide film with gallium added thereto or a zinc oxide film with gallium and silicon added thereto.

BEST MODE FOR CARRYING OUT THE INVENTION

Figure 1:
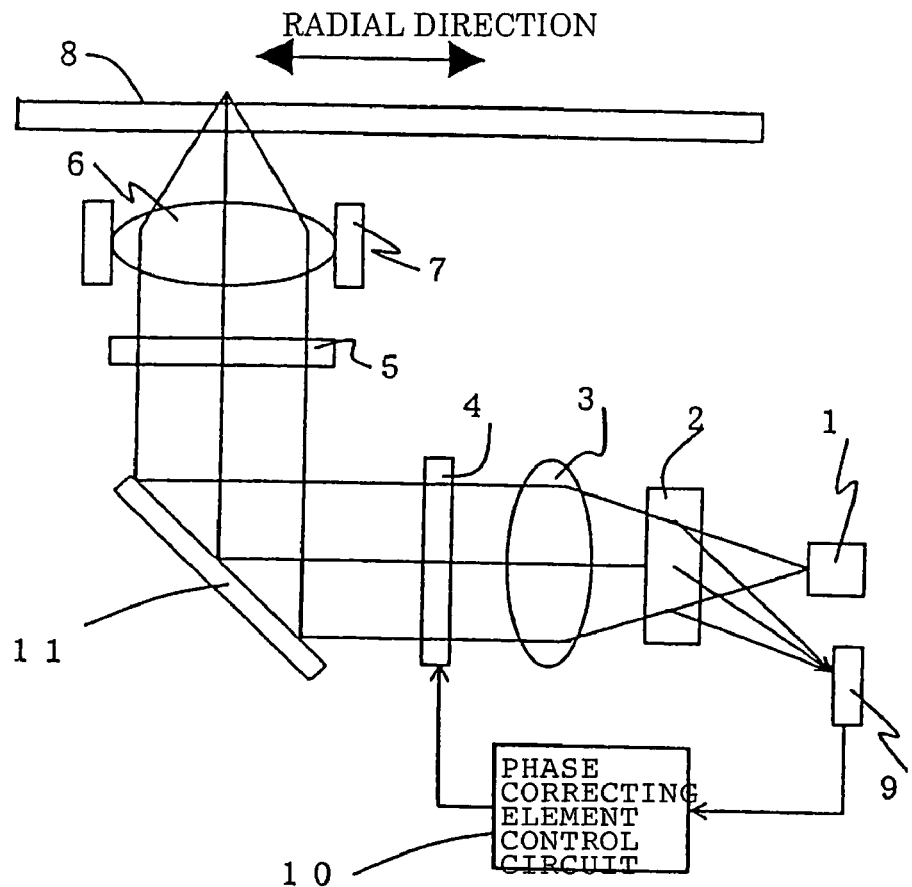
FIG. 1 is a schematic sectional view showing an example of the principle and structure of an optical head device according to the present invention.

FIG. 1 is shown an example of the principle and structure of the optical head device according to the present invention. The optical head device shown in FIG. 1 is one that reproduces information recorded on an optical disc 8, such as a CD and a DVD, wherein outgoing light from a light source 1, such as a semiconductor laser, is made into collimated light after passing through a polarized beam splitter 2, such as a hologram type one, passes through a phase correcting element 4, is reflected in a 90° direction by an upwarding guiding mirror 11, passes through a quarter-wave plate 5, and is converged on the optical disc 8 by an objective lens 6 provided in an actuator 7. Both paired substrates forming the phase correcting element 4 are transparent. Both substrates may not transparent, in other words, only one of the substrates may be transparent, which will be described later.

The converted light is reflected by the optical disc 8, sequentially passes the objective lens 6, the quarter-wave plate 5, the upwarding guiding mirror 11, the phase correcting element 4 and the collimating lens 3 in the reverse direction, and then is diffracted by the polarized beam splitter 2 to enter a photo-detector 9. When the outgoing light from the semiconductor laser 1 is reflected by the optical disc 8, the reflected light is amplitude-modulated by information recorded on the optical disc surface, and the recorded information can be read as light intensity signals by the photo-detector 9. The polarized beam splitter 2 includes, e.g., a polarized hologram and intensively diffracts light with a polarized component in an anisotropic direction (a direction having different refractive indices) to direct the light to the photo-detector 9. A phase correcting element control circuit 10 as a control voltage generator outputs a voltage to the phase correcting element 4 so that, for example, the intensity of reproduced signals from the optical disc obtained by the photo-detector 9 are optimized. The voltage outputted from the phase correcting element control circuit 10 is a voltage in response to an amount of the tilt of the optical disc or an amount of the shift of the objective lens, which is a substantially variable voltage applied to an electrode of the phase correcting element 4.

The upwarding guiding mirror 11 works to reflect the outgoing light from the semiconductor laser 1 in about a 90° direction to direct the light into the optical disc, and the mirror is an optical element, which is preferably used to reduce the thickness of the optical head device (in a direction perpendicular to the surface of the optical disc 8). Normally, an optical element with a highly reflective film, such as aluminum, deposited on a glass surface is used as the mirror.

Although the mirror 11 is utilized to change the light path of the outgoing light from the semiconductor laser 1 in FIG. 1, the direction of the outgoing light from the semiconductor laser 1 may be originally set to extend perpendicularly to the surface of the optical disc 8 without using the mirror 11.

An optical crystal, such as lithium niobate, or a liquid crystal can be used as the anisotropic optical medium. It is preferable that a liquid crystal is used as the anisotropic optical medium since it is possible to control a substantial refractive index easily by a low voltage, such as about 6V, and continuously in response to the magnitude of a voltage. A liquid crystal is preferable since it has good productivity in comparison with, e.g., an optical crystal, such as lithium niobate. From this viewpoint, a case wherein a liquid crystal material is used as the anisotropic optical medium will be explained.

A nematic liquid crystal, which is used for display applications, is suited as the liquid crystal material to be used, and the nematic liquid crystal may be twisted by addition of a chiral agent.

As the material of the substrates to be used, glass, acrylic resin, epoxy resin, vinyl chloride resin, polycarbonate resin and the like may be used, and glass substrates are preferable in terms of durability and other factors. From this viewpoint, a case wherein glass is used as the substrate material will be explained.

Now, the structure of the phase correcting element used in the present invention will be described, referring to FIG. 2. Glass substrates 21a, 21b are bonded by seals 22 with, e.g., epoxy resin contained as a main component to provide a liquid crystal cell. The seals 22 include a spacer made of, e.g., glass and an electrically conductive spacer having, e.g., gold coated on a surface of, e.g., resin. The glass substrate 21a has an electrode 24a, an insulating layer 25 with silica and another material contained as main components, and an alignment layer 26 coated on an inner surface thereof in this order from the inner surface, and the glass substrate 21b has an electrode 24b, an insulating layer 25 with silica and another material contained as main components, and an alignment layer 26 coated on an inner surface thereof in this order from the inner surface. The liquid cell may have an outer surface coated with an anti-reflection film.

The electrode 24a has a wiring pattern that has an electrode lead 27 connected with the phase correcting element control circuit through a connecting wire. The electrode 24b is electrically connected to the electrode 24a on the glass substrate 21a through the conductive spacers having gold or another material coated thereon as explained, and the electrode 24b can be connected to the phase correcting element control circuit at the electrode lead 27 through the connecting wire. Although it is not shown in FIG. 2 that the electrode 24b and the electrode 24a contact the seals 22, both electrodes contact the seals in a direction in parallel with the drawing sheet to be electrically connected through conductive spacers. The liquid crystal cell has liquid crystals 23 filled therein, and liquid crystal molecules 28 shown in FIG. 2 are in a homogeneous alignment state with single alignment.

In the phase correcting element according to the present invention, at least one of the electrode 24a and the electrode 24b has a plurality (two or more) of power supply electrodes provided at different positions on a surface thereof to supply different voltages to the positions. In other words, two or more supply portions are provided in case of the provision of the supply portions on a single electrode, and two or more power supply electrodes are provided on the respective electrodes in case of the provision of the power supply electrodes on both electrodes (totally four or more power supply electrodes).

Figure 2:
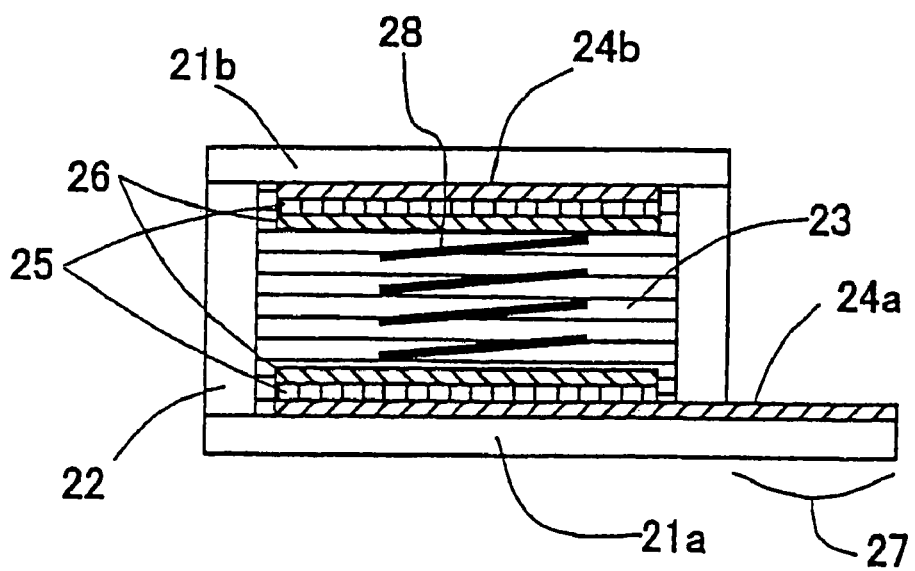
FIG. 2 is a cross-sectional view showing an example of the phase correcting element according to the present invention.

As the material for the alignment layers are preferable ones with the liquid crystal molecules 28 having a pretilt angle between 2°–10° and acceptable ones with a polyimide film subjected to rubbing treatment in right-hand and left-hand directions in parallel with the drawing sheet of FIG. 2 or with a silica layer obliquely deposited. An increase in the difference between the ordinary refractive index and the extraordinary refractive index of a liquid crystal and a decrease in the spacing of the liquid cell are preferable in terms of good response. However, it is preferable that the difference between the ordinary refractive index and the extraordinary refractive index is 0.1–0.2 and that the spacing is about 2–5 µm since fabrication of the liquid cell becomes more difficult as the spacing becomes smaller.

In the case of the optical head device shown in FIG. 1, the material for the electrodes 24a, 24b preferably has a high transmission rate since the paired substrates are both transparent and since light passes through the phase correcting element 4, and a transparent and electrically conductive film, such as ITO film and a zinc oxide film, may be used. In this case, the phase correcting element 4 is used as a transmission element.

However, when only one of the paired substrates is a transparent substrate, either one of the electrodes 24a, 24b can be fabricated from a material having a high reflectivity, such as aluminum and chromium, to use the phase correcting element 4 as a reflection element. In this case, the phase correcting element 4 in place of the upwarding guiding mirror 11 of FIG. 1 can be located at the position of the mirror. If the electrode on the side with the light entering first (e.g., the electrode 24a) is a transparent electrode having a high transmission rate, and the other electrode (e.g., the electrode 24b) is an electrode having a high reflectivity, the light having entered the phase correcting element 4 passes through the transparent electrode 24a and the liquid crystal, is reflected by the electrode 24b and is directed to the optical disc 8, passing through the liquid crystals and the transparent electrode 24a.

When a reflection element is used as the phase correcting element 4 as stated earlier, i.e., when one of the paired substrates forming the phase correcting element is a transparent substrate, the number of parts can decrease and the thickness of the optical head device can be made thinner since the upwarding guiding mirror of FIG. 1 can be replaced by the phase correcting element 4. In this case, the spacing of the liquid crystal cell (the thickness of the liquid crystal layers in the liquid crystal cell) may be differentiated from the case of a transmission element since the light entering the phase correcting element 4 passes through the liquid crystals 23 twice at an angle of about 45°.

Although explanation of the structure required for the function for changing the wave front by use of the phase correcting element has been made, the phase correcting element 4 can combine the functions of the wave plate 5 and the polarized beam splitter 2 by laminating a wave plate or a polarized hologram on the phase correcting element 4. In this case, assembly and adjustment can be preferably facilitated, and productivity can be preferably improved since the number of the optical parts forming the optical head device decreases.

The phase correcting element 4 may have a diffraction element, a dichroic aperture limitation layer for changing luminous flux size by a light source wavelength or another layer laminated thereon, or the glass substrates 21a, 21b may have outer surfaces directly provided with the dichroic aperture limitation layers, which is preferable since productivity is improved in comparison with addition of discrete parts. If a wave plate is laminated, the wave plate may be applied directly to the glass substrate on the side of the optical disc, or a glass substrate with the wave plate applied thereto is laminated on the glass plate on the side of the optical disc.

Now, the power supply electrodes as members for voltage supply, which are provided on the electrode of a substrate forming the phase correcting element and sandwiching the anisotropic optical medium in the present inventions, will be explained. As stated later, the power supply electrodes are at an equal potential on voltage application since the resistivity of the power supply electrodes is extremely smaller than that of the electrode.

In the present invention, each of the paired substrates has each of the electrodes provided thereon (one surface), totally providing the two electrodes (two surfaces). It is preferable that the respective electrodes are provided on the opposed surfaces of the paired substrates. The following examples are listed as the modes of these electrodes and the power supply electrodes.

(1) Case wherein each of the electrodes on the two surfaces comprises a single continuous electrode (a) One of the electrodes has two or more power supply electrodes provided at different positions thereon, the other electrode has no power supply electrode provided thereon, and a voltage to be applied to the electrode opposed to a power supply electrode can be differentiated from a voltage to be applied to the electrode opposed to another power supply electrode.

(b) One of the electrodes has two or more power supply electrodes provided at different positions thereon, and the other electrode also has two or more power supply electrodes provided at different positions thereon.

In the case of (b) wherein each of the electrodes on the two surfaces has two or more power supply electrodes provided thereon, the power supply electrodes may be located in confronted fashion or in unconfronted fashion between both electrodes.

(2) Case wherein one of the electrodes on the two surfaces comprises a single continuous electrode, and the other comprises divided electrodes obtainable by dividing a single continuous electrode into plural sections (c) The single continuous electrode on the one surface has two or more power supply electrodes provided at different positions thereon, the plural divided electrodes on the other surface have no power supply electrode provided thereon, and a voltage to be applied to the divided electrode opposed to a power supply electrode can be differentiated from a voltage to be applied to the divided electrode opposed to another power supply electrode. (d) The single continuous electrode on the one surface has two or more power supply electrodes provided at different positions thereon, and a divided electrode among the divided electrodes on the other surface has two or more power supply electrodes provided thereon.

(e) The single continuous electrode on the one surface has two or more power supply electrodes provided at different positions thereon, and the plural divided electrodes on the other surface all have two or more power supply electrodes provided thereon.

(f) The single continuous electrode on the one surface has no power supply electrode provided thereon, a divided electrode among the plural divided electrodes on the other surface has two or more power supply electrodes provided thereon, and a voltage to be applied to the electrode opposed to a power supply electrode can be differentiated from a voltage to be applied to the electrode opposed to another power supply electrode.

(g) The single continuous electrode on the one surface has no power supply electrode provided thereon, the plural divided electrodes on the other surface all have two or more power supply electrodes provided thereon, and a voltage to be applied to the electrode opposed to a power supply electrode can be differentiated from a voltage to be applied to the electrode opposed to another power supply electrode.

(3) Case wherein the electrodes on the two surfaces comprise divided electrodes obtainable by dividing a single continuous electrode into plural sections (h) A divided electrode among the divided electrodes or all divided electrodes on one of the surfaces have two or more power supply electrodes provided thereon, the plural divided electrodes of the other surface have no power supply electrode provided thereon, and a voltage to be applied to the divided electrode opposed to a power supply electrode can be differentiated from a voltage to be applied to the divided electrode opposed to another power supply electrode.

(i) A divided electrode among the divided electrodes or all divided electrodes on one of the surfaces have two or more power supply electrodes provided thereon, and a divided electrode among the plural divided electrodes on the other surface has two or more power supply electrodes provided thereon.

(j) A divided electrode among the plural divided electrodes or all divided electrodes on one of the surfaces have two or more power supply electrodes provided thereon, and the divided electrodes on the other surface all have two or more power supply electrodes provided thereon.

When voltages are applied to the anisotropic optical medium, the respective power supply electrodes work as stated below. First, a case wherein each of the electrodes on the two surfaces comprises a single continuous electrode will be explained.

When only one of the electrodes has two or more power supply electrodes provided thereon, the electrode having a single power supply electrode serves as a common electrode C (equal potential), different voltages are supplied between the two or more power supply electrodes ($S_1, S_2, S_3 \ldots$) on the one electrode and the common electrode, i.e., between $C$-$S_1$, $C$-$S_2$, $C$-$S_3$ . . . .

When each of the electrodes has two or more power supply electrodes provided thereon, and when the power supply electrodes are located in confronted fashion between both electrodes, different voltages are supplied between the two or more power supply electrodes ($S_1, S_2, S_3 \ldots$) on one of the electrode and the two or more power supply electrodes ($S_1', S_2', S_3' \ldots$) on the other electrode, i.e., between $S_1'$-$S_1$, $S_2'$-$S_2$, $S_3'$-$S_3$ . . . .

When each of the electrodes has two or more power supply electrodes provided thereon, and when the power supply electrodes are located in unconfronted fashion and deviated each other between both electrodes, different voltages are supplied between the two or more power supply electrodes ($S_1, S_2, S_3 \ldots$) on one of the electrode and the two or more power supply electrodes ($T_1, T_2, T_3 \ldots$) on the other electrode, i.e., between $T_1$-$S_1$, $T_2$-$S_2$, $T_3$-$S_3$ . . . .

In case of the provision of the electrodes in unconfronted fashion, the shape or the size of the power supply electrodes may be different from each other between $T_1$ and $S_1$, $T_2$ and $S_2$, $T_3$ and $S_3$, and another pair, and a suitable shape or a suitable size may be selected according to purposes. In case of the provision of the electrodes in confronted fashion as well, the shape or the size of the power supply electrodes may be different from each other as required.

Next, when the electrode on one of the two surfaces is divided into a plurality of divided electrodes ($U_1$, $U_2$, $U_3$ . . . ), and when the other electrode comprises a single continuous electrode having a plurality of power supply electrodes ($S_1$, $S_2$, $S_3$ . . . ), different voltages are supplied between the divided electrodes and the power supply electrodes, i.e., between $U_1$-$S_1$, $U_2$-$S_2$, $U_3$-$S_3$, . . . .

With regard to the other modes of the electrodes except for the ones stated earlier, the respective power supply electrodes have similar functions.

The provision of the power supply electrodes at about 10 locations on an electrode can change the wave front at a sufficient amount, though the number of the power supply electrodes varies according to their purpose or shape.

Now, a thin film resistor, which is provided on the electrode on a substrate forming the phase correcting element to make electrical connection between power supply electrodes for voltage supply in accordance with the present invention will be explained. In the phase correcting element according to the present invention, at least two of the power supply electrodes, which are provided on the electrode on, e.g., a single substrate, are electrically connected on the substrate by the thin film resistor made of an electrically conductive thin film. Advantages offered by the provision of the thin film resistor will be described in detail about a case wherein spherical aberration is corrected.

Figure 3:
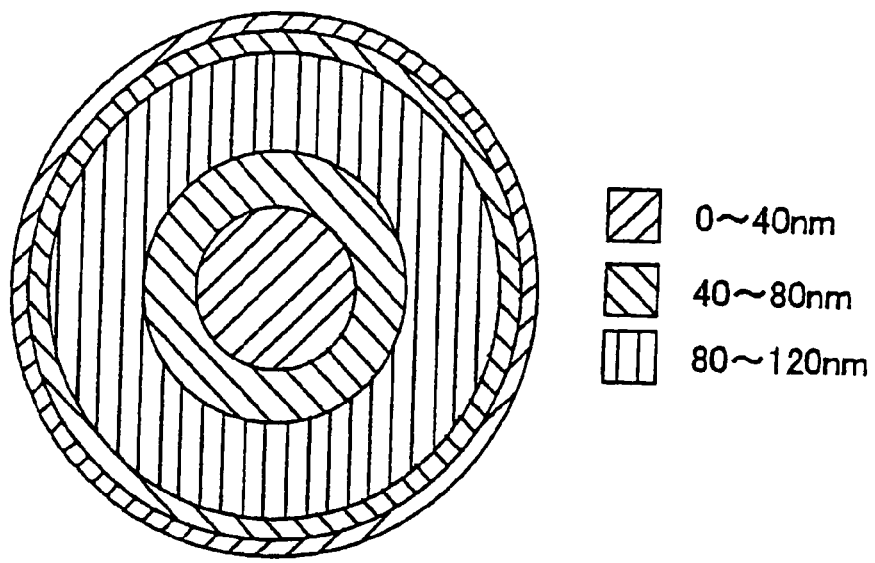
FIG. 3 is a view showing spherical aberration, which is caused when an optical disc has a thickness variation of 0.03 mm.

FIG. 3 is a view showing the wave front aberration (spherical aberration) that is caused when an optical disc has a thickness made thicker than a design value of 0.6 mm by 0.03 mm in an optical system where an objective lens has a NA of 0.65 and a light source has a wavelength of 0.4 μm. When an optical disc has a thickness made thicker than a design value, the phase at an intermediate portion between a central portion and a peripheral portion of an effective pupil advances in comparison with the central portion and the peripheral portion, while when the optical disc has a thickness made thinner than a design value, the phase at the intermediate portion delays in comparison with the central portion and the peripheral portion.

Figure 4:
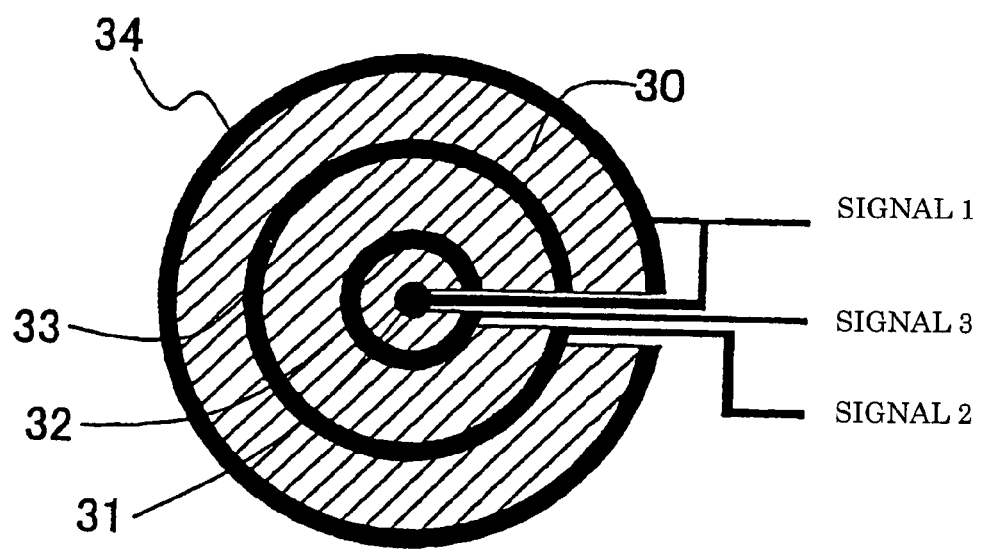
FIG. 4 is a schematic plan view showing a case wherein conventional leads (wires) are provided on an electrode pattern of the phase correcting element according to the present invention.

Now, a phase correcting element with leads (wires) conventionally provided will be explained to obtain easy comparison with the phase correcting element according to the present invention. FIG. 4 shows an example wherein the conventional wires are used in the electrode pattern of the phase correcting element according to the present invention for correcting the spherical aberration stated earlier, and wherein there is no thin film resistor. The hatched portion in FIG. 4 is a transparent electrode 30, which is made of a transparent and electrically conductive film having high resistance, and which has power supply electrodes 32, 33, 34 concentrically provided thereon about a power supply electrode 31, and wherein the power supply electrodes 31–34 are connected to an external signal source through wires indicated by thick linear lines in this figure, and wherein the power supply electrodes 31, 34 are supplied with a signal 1, the power supply electrode 32 is supplied with a signal 3 and the power supply electrode 33 is supplied with a signal 2 to apply voltages to the respective power supply electrodes.

Figure 5:
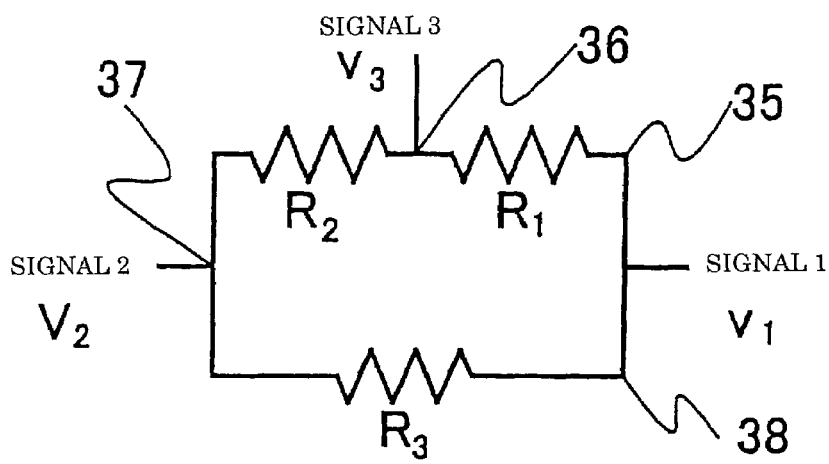
FIG. 5 is a circuit diagram showing an equivalent circuit of the phase correcting element of FIG. 4.

As a result, the conventional lead pattern requires an external signal source for generating three or more signals (three signals in FIG. 4). FIG. 5 shows an equivalent circuit diagram of the electrode pattern of the phase correcting element of FIG. 4. Points 35, 36, 37 and 38 correspond to the power supply electrodes 31, 32, 33 and 34. A resistor $R_1$ designates a resistor between the power supply electrodes 31 and 32 caused by the transparent electrode 30, and $R_2$ and $R_3$ likewise designate resistors between the power supply electrodes 32 and 33, and between the power supply electrodes 33 and 34. In this explanation, the resistance of the power supply electrodes and the resistance of the wires between the power supply electrodes and the external signal source are ignored in the equivalent circuit since each resistance is quite smaller than the resistors $R_1$, $R_2$, $R_3$ caused by the transparent electrode 30.

Figure 6:
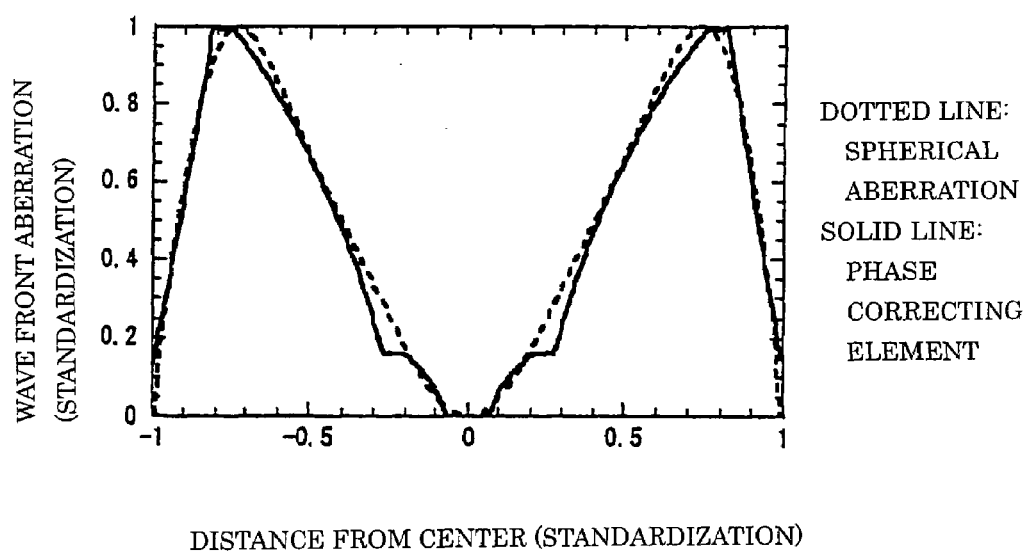
FIG. 6 is a diagram showing an example of phase variations, which are caused in the phase correcting element according to the present invention.

The materials for the transparent electrode 30 and the power supply electrodes will be explained in detail. In order to correct the spherical aberration of FIG. 3, voltages $V_1$, $V_2$ and $V_3$ are applied to the power supply electrodes to cause voltage drops in the transparent electrode 30, developing a continuously variable potential distribution. FIG. 6 is a diagram wherein the relationship between amounts of spherical aberration and magnitudes of potentials is compared at a sectional plane passing through the center, and the shape of a potential distribution can be conformed to the shape of an aberration distribution by properly setting the voltages $V_1$, $V_2$ and $V_3$.

The liquid crystal molecules in the phase correcting element have alignment directions continuously varied according to locations. As a result, substantial refractive index differences δn in liquid crystal birefringence continuously vary since such a continuously variable potential distribution causes the alignment directions to continuously vary according to locations. Since the wave front of incident light is subjected to a phase shift according to the magnitude of δn, the amounts of the phase shifts can be varied according to the magnitudes of applied voltages. Thus, the wave front aberration can be canceled and corrected by applying voltages corresponding to the amount caused by aberration.

Figure 7:
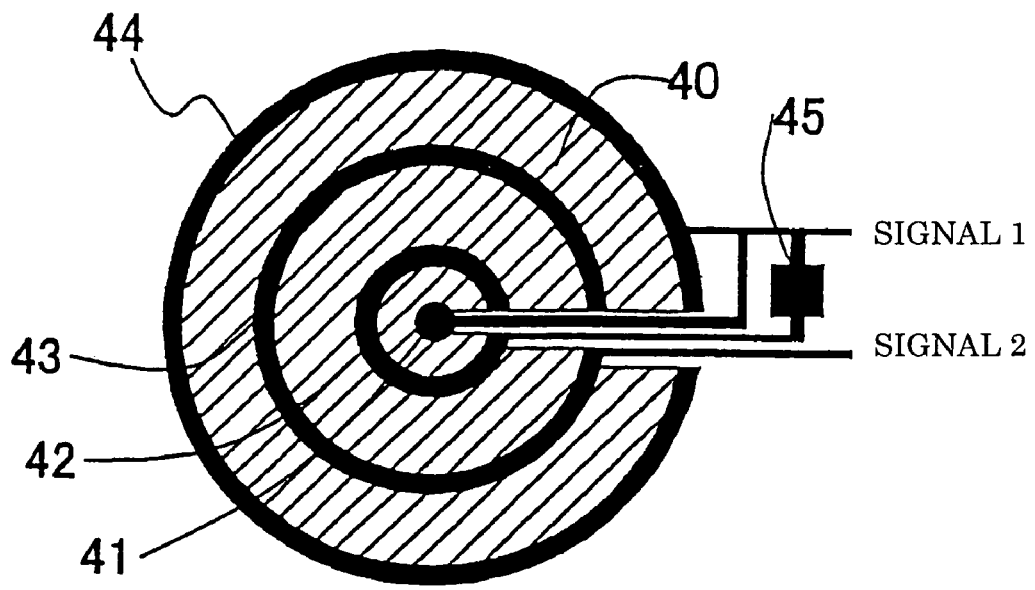
FIG. 7 is a schematic plan view showing an example of a thin film resistor on the electrode pattern of the phase correcting element according to the present invention.
Figure 8:
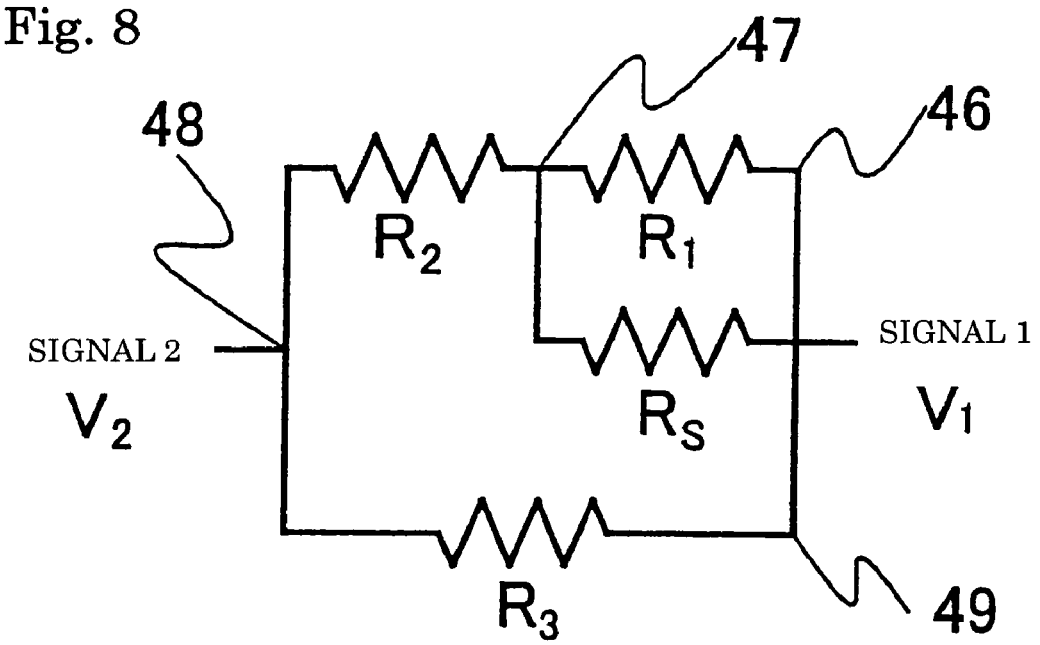
FIG. 8 is a circuit diagram showing an example of the equivalent circuit of the phase correcting element of FIG. 7.

This is explanation of the phase correcting element with the wires conventionally provided, and the phase correcting element according to the present invention will be now described. FIG. 7 is a view showing an electrode pattern and an example of the thin film resistor 45 (according to the present invention) in the phase correcting element according to the present invention. A transparent electrode 40, power supply electrodes 41, 42, 43, 44 and signals 1, 2 are the same as the case of FIG. 4, and it is different in that the power supply electrode 42 can be electrically connected to the power supply electrodes 41, 44 by use of the thin film resistor 45 to have the signal 1 applied thereto. In FIG. 8 as in FIG. 5, points 46, 47, 48 and 49 correspond to the power supply electrodes 41, 42, 43 and 44, and resistors $R_1$, $R_2$ and $R_3$ indicate the resistance between the power supply electrodes 41 and 42, between the power supply electrodes 42, 43, and between the power supply electrodes 43 and 44 in the transparent electrode 40. $R_S$ indicates the resistance of the thin film resistor 45, which divides a voltage $V_1$ supplied from the signal 1 to create a desired voltage at the point 47. Thus, the phase correcting element according to the present invention can be activated by a smaller number of signal sources than the conventional one due to no need for the signal 3, though the voltage at the point 47 (corresponding to the point 36 in FIG. 5) is created by the signal 3 caused by another signal source in the case of the conventional wiring arrangement. The voltage $V_3$ at the point 47 can be found by the following equation (1) according to Ohm's law.

$$V_3 = \{R_2(R_1+R_S)V_1 + R_1R_SV_2\}/(R_1R_2+R_1R_S+R_2R_S) \quad (1)$$

Provided that the resistance $R_1$, $R_2$ of the transparent electrode and driving voltage $V_1$, $V_2$ are known, $R_S$ can be properly set to obtain application of a voltage equal to the voltage that has conventionally been supplied from the external signal source.

The resistance $R_S$ of the thin film resistor can be expressed as $R_S = \rho_L \times L/W$, wherein the sheet resistance of the electrically conductive thin film forming the thin film resistor is $\rho_L$, and the thin film resistor has a width W and a length L. For example, in order to obtain a state of $R_S = 10$ kΩ, setting of $\rho_L = 300$ Ω/□, L=1 mm and W=30 μm may be done. It is preferable that the line width W of the thin film resistor is 10 μm or wider, since variations in resistance due to form tolerance become significant if the line width is too narrow. If the length L is too great to put the thin film resistor on the substrate, the thin film resistor may be bent at an intermediate portion.

Although the voltage $V_1$ by the signal 1 is divided to create the voltage at the point 47 in the structure stated above, the voltage $V_2$ by the signal 2 may be divided according to a similar principle. In this case, the thin film resistor is connected to the wire on the side of the signal 2 in FIG. 7, and the thin film resistor is provided between the points 47 and 48 so as to be in parallel with the resistor $R_2$ in the equivalent circuit of FIG. 8.

Now, the values of resistance of the electrodes, the power supply electrodes and the thin film resistor, and the materials for these members will be explained. It is preferable that the ratio $\rho_T/\rho_S$ of the sheet resistance $\rho_T$ of an electrode material forming the electrodes to the sheet resistance $\rho_S$ of a power supply electrode material forming the power supply electrodes is set at a value of not less than 1000. When $\rho_T/\rho_S$ is small, it is difficult to obtain a desired voltage distribution in some cases since a relatively large current flows in the electrodes as well to cause a voltage drop in the power supply electrodes in contact with the electrodes. From this viewpoint, as the sheet resistance of the electrode material increases in comparison with the power supply electrode material, the potentials between adjoining power supply electrodes can be continuously varied easily, obtaining a desired potential distribution. Setting $\rho_T/\rho_S$ at a value of not less than 1000 is a measure to meet this condition.

However, if $\rho_T$ is too large, the power supply electrodes lose electrical conduction, causing no potential distribution. In other words, it is preferable that $\rho_S$ is minimized, and that $\rho_S$ is about 0.1–10 Ω/□, and $\rho_T$ is about 100—100 kΩ/□.

Although satisfaction of these requirements and setting of $\rho_S$ and $\rho_T$ at proper values cause each of the power supply electrodes $S_1$, $S_2$, $S_3$ . . . to have an equal potential therein in a case wherein two or more power supply electrodes are provided on only one of the electrodes and the two or more supply portions have different voltages supplied thereto, the potential distribution in the one electrode has a continuously variable pattern due to voltage drops caused between power supply electrodes. The continuously variable state is also applied to a case wherein two or more power supply electrodes are provided on the two electrodes (on the two surfaces) and different voltages are supplied.

Although metal materials, such as copper, gold, aluminum and chromium, are preferable as the power supply electrode material in terms of electrical conductivity and durability, materials except for metal can be used as long as their specific resistance is about $10^{-8}$–$10^{-7}$ Ω·m at room temperature. For example, a transparent and electrically conductive film, such as an ITO film, can be used, which is preferable in comparison with use of metal materials since the absence of a light shielding portion increases the transmission rate of light. However, the transparent and electrically conductive film is required to have an increased film thickness to decrease the sheet resistance since it has a greater specific resistance than metallic films.

The material of the wires on the electrode lead 27 (see FIG. 2) for applying voltages to the power supply electrodes from the phase correcting element control circuit outside may comprise a transparent and electrically conductive film, such as an ITO film, or a metallic film, such as chromium and nickel. In particular, metals solderable for connection, such as nickel, are preferable since connection with an external signal line can be easily made by solder.

On the other hand, the electrode material is required to be transparent and to have a higher sheet resistance than the power supply electrode material. A transparent and electrically conductive film, such as an ITO film, is proper, and it is preferable that the ITO film has a higher sheet resistance, especially not less than 100 Ω/□. More preferably, the sheet resistance is not less than 1 kΩ/□ since $\rho_S$ can be about 1 Ω/□, facilitating fabrication, such as a decrease in the film thickness of the power supply electrodes.

In order to increase $\rho_T$, the use of a zinc oxide film, a zinc oxide film containing gallium (GZO film) or a zinc oxide film containing gallium and silicon (GZS film) is preferable since it is easy to obtain a highly resistive film in comparison with ITO films. In particular, GZO films and GZS films are preferable materials for the optical head device according to the present invention in that these films have excellent etching properties though having a highly specific resistance, and that these films are excellent in the transmission rate of light and durability.

When gallium is added to a zinc oxide film, it is preferable that the added amount is 1–10 mass % since the addition causes the transmission rate of the film to change. When gallium and silicon are both added to a zinc oxide film, it is preferable that the total added amount is 1–20 mass % since the addition causes the transmission rate of the film to change.

On the other hand, the material for the thin film resistor is required to be a material having $R_3$ that meets with the relationship defined in the equation (1). For application to the optical head device, setting the value of resistance of the thin film resistor at 100 Ω–1000 kΩ is preferable since fabrication of the electrodes and the thin film resistor becomes easy, and ITO, GZO, GZS and the like can be used. Selection of the same material as the electrode material for the material of the thin film resistor and concurrent formation of the thin film resistor with the electrodes are preferable since an effect that the value of resistance of the material could vary according to lots is canceled by the denominator and the numerator as shown in the equation (1), providing no effect to $V_3$.

Next, the shape and the size of the power supply electrodes will be explained. It is preferable that the shape and the size of the power supply electrodes are varied according to circumstances as stated earlier. The shape and the size may be varied according to the kind of wave front aberration to be corrected or the shape of a wave front to be generated since changes in the wave front caused by the phase correcting element depend on the shape and the size of the power supply electrodes. Examples of the wave front aberration are coma aberration, spherical aberration, astigmatism and the like.

The coma aberration is aberration caused by a tilt of the optical disc as stated earlier, and the aberration has such a shape that it overlaps when it rotates through an angle of 180° around a linear line passing through the center of incident luminous flux on the phase correcting element, and extending in parallel with the element surface and with the rotational direction of the optical disc. From this viewpoint, it is preferable that the power supply electrodes are provided so as to be symmetrical with respect to the parallel linear line stated above.

Specifically, a single continuous electrode has a central portion provided with a power supply electrode in a rectangular or linear shape in a normal case and a peripheral portion provided with a power supply electrode in a shape similar to a peripheral portion of the electrode (e.g. an arced shape) for instance. These power supply electrodes are provided so as to be symmetrical with respect to the linear line stated above. Such provision of the power supply electrodes is preferable since it is possible to correct coma aberration most effectively.

When the spherical aberration is corrected, it is preferable that the plural power supply electrodes are annular members and are concentrically provided each other, that either one of the annular members has a radius ratio of 0.65–0.86 to luminous flux of the outgoing light starting from the light source and passing through the phase correcting element, and that another annular member different from the annular member has a radius ratio of 0.2–0.4 to the luminous flux of the outgoing light since the spherical aberration has a concentric shape around the optical axis.

In this explanation, the radius ratio of the annular members means the average of an inner radius ratio and an outer radius ratio since the annular members have doughnuts shapes, and inner and outer radii.

Since the spherical aberration normally has the maximum value in a region (region A) surrounded by a circle having a radius ratio of 0.65 and a circle having a radius ratio of 0.85, it is preferable that one of the annular members as the power supply electrodes is provided in the region A so as to have the center aligned with the optical axis, and that the power supply electrode provided by the second annular member different from the first annular member is provided to have the center aligned with the optical axis in a region (region C) surrounded by a circle having a radius ratio of 0.2 and a circle having a radius ratio of 0.4, correcting the spherical aberration with extremely high precision.

It is preferable that a circle having a radius ratio 0.7 and a circle having a radius ratio of 0.8 are selected in place of the circle having a radius ratio of 0.65 and the circle having radius ratio of 0.85, since although that region is narrower than the region A, an annular member can be added in that region where the maximum value of the spherical aberration exists with high probability, and since another annular member can be added to make fine adjustment of the spherical aberration.

When each of the electrodes comprises a single continuous electrode, it is more preferable that an additional power supply electrode in an annular member shape is provided so as to have the center aligned with the optical axis in a region in the vicinity of the optical axis (region B) including the optical axis and having a smaller radius ratio than 0.2, since it is possible to make further fine adjustment of the spherical aberration.

A case wherein the electrodes are divided electrodes, and the region B is separated from other regions (the region A, the region C etc.) is also applicable since it is possible to correct the spherical aberration with extremely high precision as stated earlier.

In the case of astigmatism, it is preferable that a plurality of power supply electrodes are radially provided on a single continuous electrode so as to pass through a single point at a central portion of the electrode, wherein an increased number of the power supply electrodes provides a further desired potential distribution. In addition, it is possible to correct wave front aberration including both coma aberration and spherical aberration, and other aberration, wherein there may be adopted measures, such as a combination of the linear power supply electrode and the concentric power supply electrodes stated earlier.

As stated earlier, the respective paired continuous electrodes may have power supply electrodes provided in different shapes so that one of the electrodes corrects coma aberration and the other electrode corrects spherical aberration. In addition, one of the paired electrodes may comprise a single continuous electrode having a power supply electrode, and the other electrode may be divided into plural divided electrodes, causing both a continuously variable aberration distribution and a stepwise variable aberration distribution. Since coma aberration, spherical aberration, astigmatism etc. as the wave front aberration is caused by the optical head device as a system, the phase correcting element according to the present invention can be incorporated into the optical head device to correct the wave front aberration effectively.

The phase correcting element according to the present invention is applicable, under a similar principle, to other purposes, such as a change in the focus position of light, in addition to correction in the wave front aberration since the phase correcting element has a function to change the wave front shape of transmitting light. For example, the phase correcting element can be employed to merely change optical magnification for changing the focus position of transmission light or be employed to put out a transmitting wave front slantwise for changing the advance direction of light.

Even in the case of correcting the wave front aberration, a higher order of wave front aberration, such as the coma aberration, the spherical aberration and the astigmatism stated earlier, can be corrected. In these cases as well, the shapes, the number and the positions of the power supply electrodes, how to divide an electrode, or other matters may be properly set according to a desired change in the wave front.

It is preferable that the phase correcting element according to the present invention has an electrode with power supply electrodes divided into a plurality of divided electrodes, that the respective divided electrodes have one or more power supply electrodes provided thereon, and that two or more among the power supply electrodes are electrically connected through a thin film resistor. If two or more power supply electrodes to be electrically connected are provided on each of the divided electrodes, a continuously variable voltage distribution can be preferably caused, and if the power supply electrodes are provided on different divided electrodes, it is possible to meet with a state wherein a discontinuously variable voltage distribution is required.

In these cases, the thin film resistor can be used to electrically connect two or more power supply electrodes, allowing the optical head device to be activated by a smaller number of external signal sources in comparison with the conventional device. Even in a case wherein one of the edges of the thin film resistor is connected to a power supply electrode, and the other edge is connected to a divided electrode without a power supply electrode, a similar effect can be offered.

Now, Examples are shown.

EXAMPLE 1

The optical head device according to this example includes a phase correcting element for correcting the coma aberration caused by a tilt of an optical disc, and the phase correcting element is characterized in that, even if there is caused a shift in an object lens in a radial direction of the optical disc, the element can obtain a phase (wave front) distribution for proper correction without integrally driving the objective lens and the phase correcting element. The optical head device with the phase correcting element incorporated thereinto in this example is one shown in FIG. 1.

Figure 9:
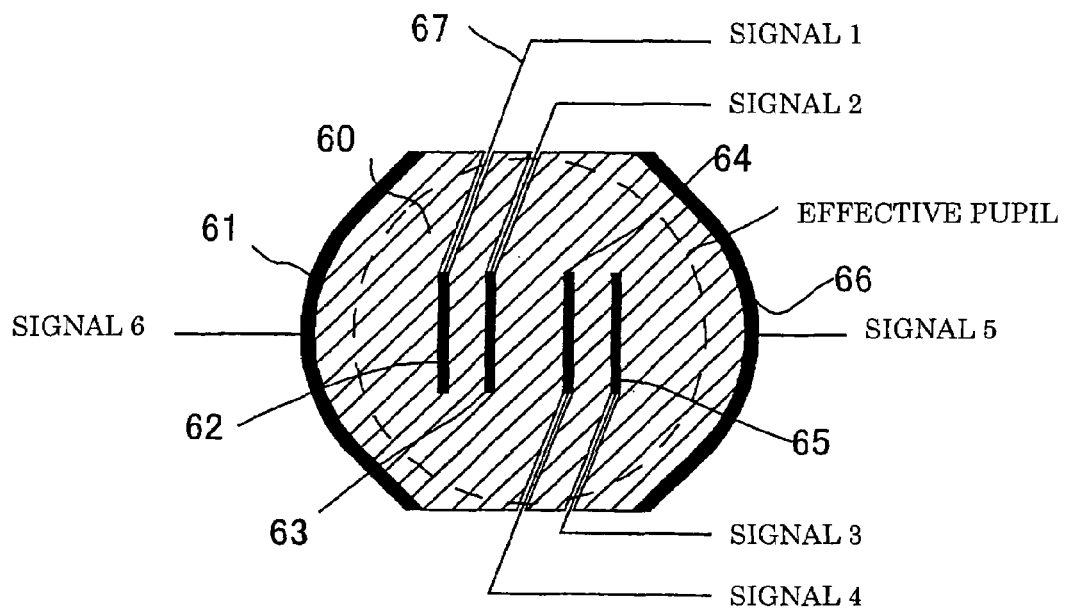
FIG. 9 is a schematic plan view showing the electrode pattern of the phase correcting element according to a first Example.

FIG. 9 shows the electrode pattern of the phase correcting element in this example, wherein the hatched portion indicates a transparent electrode 60 made of an ITO film as a single continuous electrode, and the thick lines indicate metal electrodes 61–66 as power supply electrodes. The metal electrodes 61–66 are connected to signal sources (not shown) outside the phase correcting element through metal wires 67 to be supplied with certain voltages by respective signals 1–6.

The metal electrodes 62–65 have a width of 100 μm and a length of 1.5 mm, and the metal electrodes 61 and 66 have a width of 100 μm and an arced length of 6 mm.

The electrode pattern was formed as follows. First, an ITO film was deposited on a glass substrate by a sputtering method, and then the ITO film was patterned by use of a photolithographic technique. In that time, the ITO film was left at portions for the metal electrodes, and the ITO film was removed at portions for the metal wires and their surroundings by etching to make the metal wires isolated from the transparent electrode 60. Next, the metal electrodes and the metal wires shown in FIG. 9 were provided by a lift-off method. The material used for the metal electrodes was aluminum.

By the way, a region shown in a dotted line in FIG. 9 indicates an effective pupil, through which a light ray passes when there is no shift in the objective lens, wherein the shape of the electrodes are prolonged by the amount of a shift in the objective lens along the shift direction (the right-hand and left-hand direction in this figure) of the objective lens.

Figure 10:
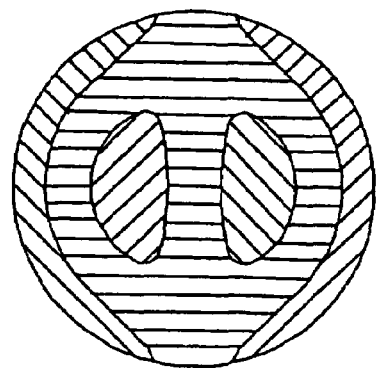
FIG. 10 is a diagram showing wave front aberration, wherein a tilt angle of 1° is caused in an optical disc.

Now, the reason why the phase correcting element of this example can be employed to correct the tilt of the optical disc effectively even if there is caused a shift in the objective lens will be explained. In FIG. 10 is shown wave front aberration (mainly coma aberration) that is a phase change caused when an optical disc having a thickness of 0.6 mm is tilted at an angle of 1° in an optical head device, where the objective lens has an NA of 0.6 and the light source has a wavelength of 0.6 μm. If the phase change by the phase correcting element has a reversed phase to the amount of the wave front aberration of FIG. 10, the wave front aberration caused by the tilted optical disc can be canceled.

Figure 11:
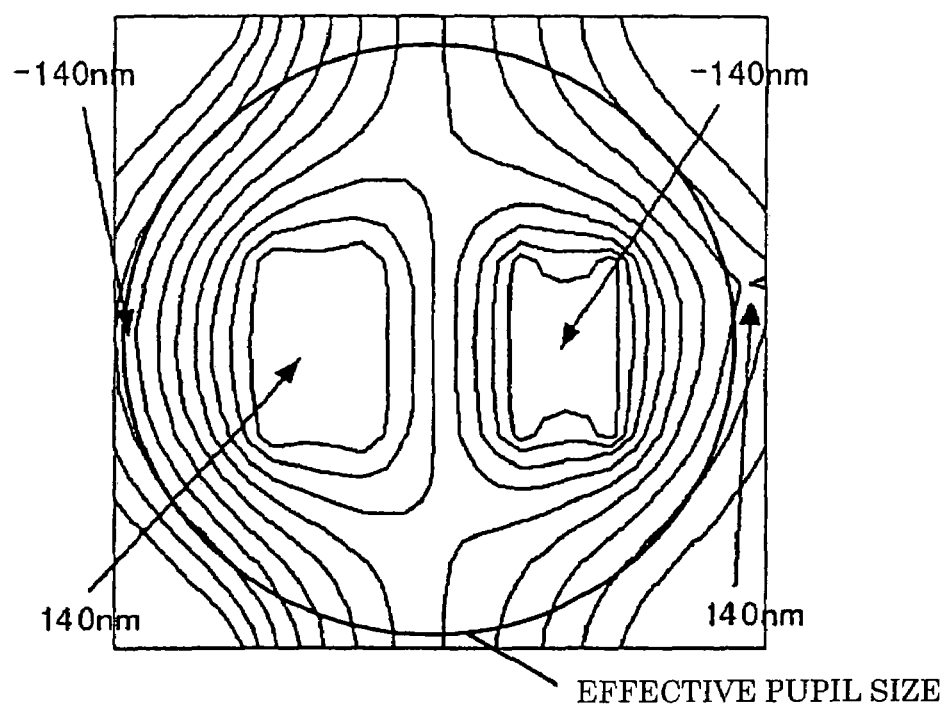
FIG. 11 is a diagram showing a phase change caused by the phase correcting element according to the first Example (when there is no lens shift)

The phase correcting element in this example provided a phase change to cancel the wave front aberration as follows:

First, FIG. 11 shows the phase change that was caused by the phase correcting element when there was no shift in the lens. In FIG. 11, the phase change is shown in nm, the phase change was caused to have different magnitudes of 140 nm (a substantially rectangular portion) and −140 nm (a peripheral portion of the effective pupil) in opposite directions in a left half region for instance, and the curves between these portions indicate contour lines, each of which indicates about 47 nm in FIG. 11.

In this example, a voltage of 1.5V was supplied to the metal electrode 61 of FIG. 9, a voltage of 2.7V was supplied to the metal electrodes 62, 63 of FIG. 9, a voltage of 1.9V was supplied to the metal electrode 64, 65 of FIG. 9, and a voltage of 3.2V was supplied to the metal electrode 66 of FIG. 9 when there was no shift in the lens. In this example, the electrode that was opposed to the electrode with the six power supply electrodes (the metal electrodes) comprises a single continuous and transparent electrode and constantly is at a potential of 0V.

Since the transparent electrode 60 having a high resistance is electrically connected to the metal electrodes 61–66 having different potentials, the voltages vary according to locations, producing an uneven voltage distribution. Since the liquid crystal molecules in the phase correcting element have alignment directions changed by voltage application to cause variations in the alignment direction according to the uneven voltage distribution, the phase change $\delta n \cdot d$ of incident light varies according to locations. In this explanation, d indicates the distance between the substrates of the liquid crystal cell, and $\delta n$ indicates the substantial refractive index difference at each of points therein, which varies according to an applied voltage.

In this example, the phase change of FIG. 11, which was provided by supplying the voltages to the metal electrodes 61–66 as explained, canceled the wave front aberration of FIG. 10.

Figure 12:
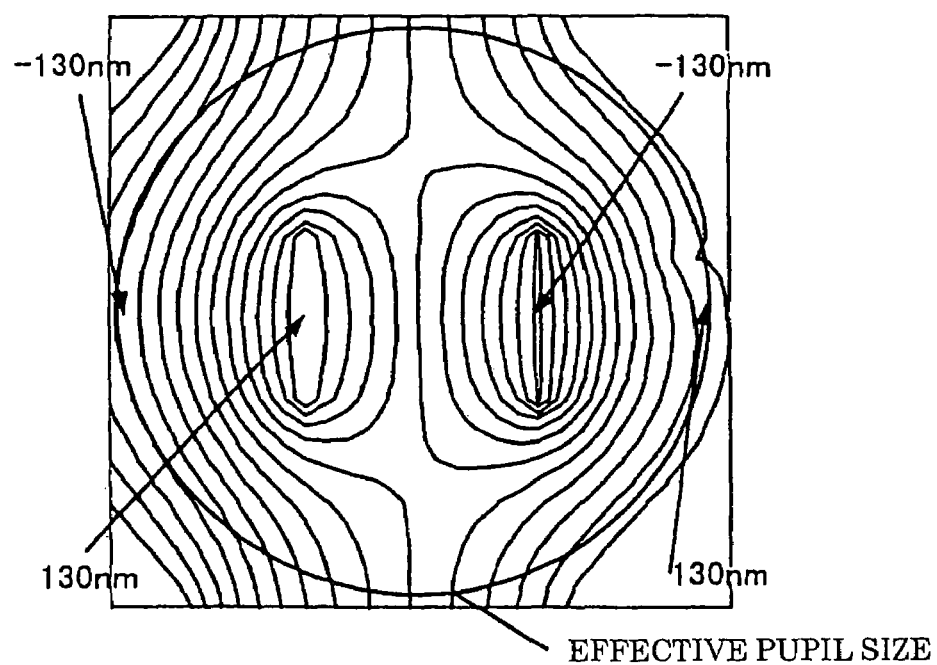
FIG. 12 is a diagram showing a phase change caused by the phase correcting element according to the first Example (when there is a lens shift in the right-hand direction)

Next, a case wherein there was caused a shift in the lens in the right-hand direction of FIG. 9 will be explained. In FIG. 12 is shown the phase change that is provided by the phase correcting element to correct the wave front aberration (mainly the coma aberration) caused when the shift amount of the lens is 0.3 mm and the disc has a tilt angle of 1°. In this case, the signals 1–6 were set so that a voltage of 1.5V was supplied to the electrode 61, a voltage of 2.6V was supplied to the electrode 63, a voltage of 1.8V was supplied to the electrode 65, and a voltage of 2.7V was supplied to the electrode 66 though no voltage was not supplied to the electrode 62 or 64. The effective pupil on the phase correcting element shifts in the right-hand direction, following the shift in the lens. From this viewpoint, by supplying the voltages to the metal electrodes 66, 65 on the right side among the paired metal electrodes 62, 63 and the paired metal electrodes 64, 65, the wave front aberration shown in FIG. 10 could be corrected since the position having the maximum magnitude in the phase change moved, following the shift of the lens.

Likewise, when there was caused a shift in the lens in the left-hand direction, the wave front aberration could be corrected as in the case in the right-hand direction since the signals 1–6 were set so that a voltage of 1.5V was supplied to the electrode 61, a voltage of 2.4V was supplied to the electrode 62, a voltage of 1.6V was supplied to the electrode 64, and a voltage of 2.7V was supplied to the electrode 66, though no voltage was supplied to the electrode 66 or 65.

The maximum value of the shift amount of the lens in this examples was 0.4 mm, and the distance between the metal electrodes 62 and 63, and the distance between the metal electrodes 64 and 65 were set at 0.6 mm to be able to correct the wave front aberration even if the shift amount of the lens had the maximum value. It is preferable that these distances are set at about 70–80% of the shift amount of the lens to be considered.

When the shift amount of the lens was larger or smaller than 0.3 mm, the voltages supplied to the metal electrodes 62–65 were properly modified to continuously correct the wave front aberration to the tilt of the optical disc and the shift of the lens.

Although the case wherein no voltage was supplied to the metal electrode 62 or 64 in the above-mentioned case has been explained, a voltage intermediate between the voltages supplied to the metal electrodes 61 and 63 may be supplied to the metal electrode 62, and a voltage intermediate between the voltages supplied to the metal electrodes 65 and 66 may be supplied to the metal electrode 64, providing a phase change similar to FIG. 12.

As explained, the optical head device according to this example can effectively correct the coma aberration caused in a tilt of the optical disc even if the objective lens has moved. In comparison with the conventional phase correcting element with the electrodes divided, the light scattering in divided regions can be restrained, improving the transmission rate by 3%.

EXAMPLE 2

The optical head device according to this examples includes a phase correcting element for correcting spherical aberration caused by variations in the thickness of an optical disc. When the thickness of an optical disc is deviated from a design value, the objective lens produces spherical aberration, lowering the reading accuracy of signals. The phase correcting element for correcting this spherical aberration was incorporated as the phase correcting element 4 of the optical head device of FIG. 1. However, the phase correcting element control circuit 10 was modified for the phase correcting element of this example.

The element structure of the phase correcting element of this example is the same as the one shown in FIG. 2, and only the electrode pattern is different as stated below. With regard to the production method and the structure material of the phase correcting element, the same ones as in the Example 1 were used. Now, the principle that the spherical aberration is corrected by the phase correcting element of this example may be explained.

FIG. 3 is a view showing front aberration (spherical aberration) that is caused when an optical disc has a thickness made thicker than a design value of 0.6 mm by 0.03 mm in an optical system where an objective lens has a NA of 0.65 and a light source has a wavelength of 0.4 μm. When an optical disc has a thickness made thicker than a design value, the phase at an intermediate portion between a central portion and a peripheral portion of an effective pupil advances in comparison with the central portion and the peripheral portion, while when the optical disc has a thickness made thinner than the design value, the phase at the intermediate portion delays in comparison with the central portion and the peripheral portion. The electrode pattern of the phase correcting element in this example is shown in FIG. 13.

Figure 13:
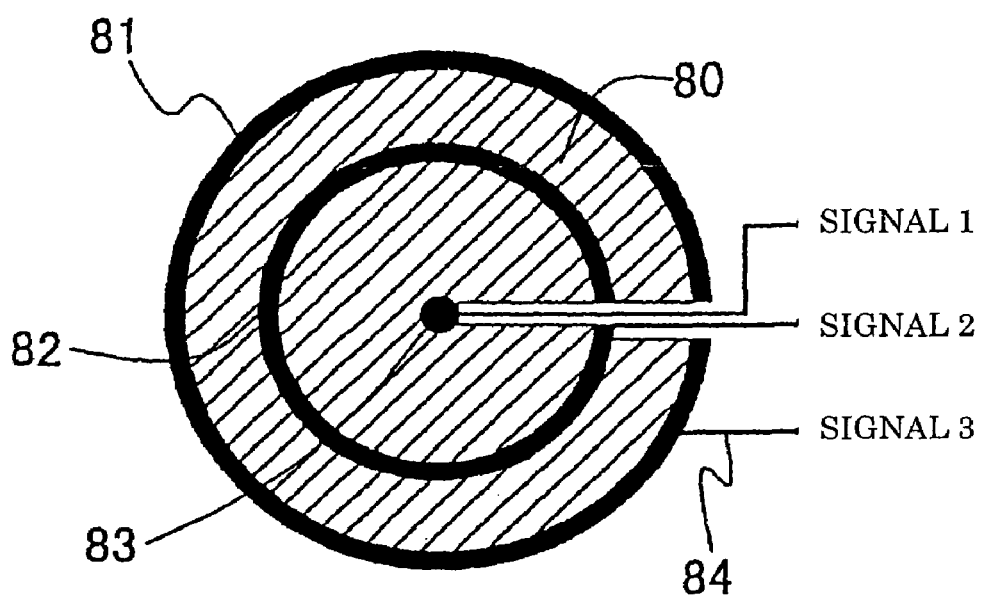
FIG. 13 is a schematic view showing the electrode pattern of the phase correcting element according to a second Example.

In FIG. 13, the hatched portion indicates a transparent electrode 80 made of an ITO film as a single continuous electrode, and the thick lines indicate metal electrodes 81–83. The respective metal electrodes 81–83 are connected to different external signal sources through metal wires 84 to be supplied with certain voltages by respective signals 1–3. The material and the fabrication method of the electrode pattern are the same as the ones in the example 1, and portions of the transparent electrode 80 around a metal wiring portion thereof connected to the metal electrodes 82, 83 are removed by etching in this example.

The metal electrodes 81 and 82 in FIG. 13 have an outer diameter of 4 mm and an outer diameter of 3 mm, respectively, and a width of 100 μm, and the metal electrode 83 has an outer diameter of 200 μm.

In order to use the phase correcting element to correct the spherical aberration that is caused by a thickness variation of 0.03 mm of the optical disc, a voltage of 2.3V was supplied to the metal electrodes 81, 83, and a voltage of 2.0V was supplied to the metal electrode 82. In this example as well, the electrode that was opposed to the electrode with the three power supply electrodes (the metal electrodes) comprises a single continuous and transparent electrode and constantly is at a potential of 0V.

Figure 14:
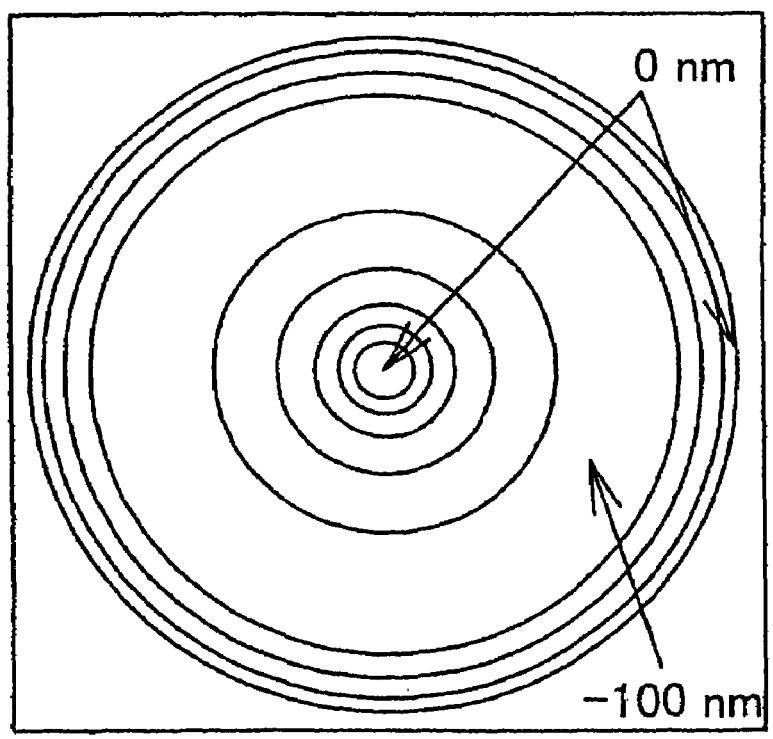
FIG. 14 is a diagram showing a phase change caused by the phase correcting element according to the second, a third or a fifth Example.

FIG. 14 shows the phase change that was caused by the phase correcting element. In FIG. 14 as in FIG. 11, the phase change is shown in nm, a central portion of the circles and a peripheral portion have a phase change of 0 nm, and a region having a phase change of −100 nm is located in an intermediate portion. The plural circles in solid lines indicate contour lines, each of which indicates 20 nm in the region of −100 nm and about 60 nm outside the region.

The transparent electrode 80 produces a voltage distribution according to the voltages applied to the respective metal electrodes. The above-mentioned explanation is also applicable, and the phase correcting element can produce the phase change in a concentric shape shown in FIG. 14 since the voltage distribution causes a substantial refractive index rate distribution in the liquid crystal.

On the other hand, when the thickness of a optical disc is thinner by 0.03 mm, a voltage of 2.0V may be supplied to the metal electrodes 81, 83, and a voltage of 2.3V is supplied to the metal electrode 82, correcting the spherical aberration wherein the positive and negative signs in FIG. 3 are reversed. Thus, the phase change caused by the phase correcting element also have a form wherein the positive and negative signs in FIG. 14 are reversed to cancel the spherical aberration. As explained, proper voltages can be supplied to the metal electrodes 81, 82, 83 to correct the spherical aberration of FIG. 3. Both metal electrodes 81, 83 may be coupled together and connected to a single power source since optical properties are not significantly effected even if an equal voltage is constantly supplied to the metal electrodes.

As explained, the optical head device according to this example was able to effectively correct the spherical aberration caused in the tilt of the optical disc. In comparison with the conventional phase correcting element with the electrodes divided, the light scattering in divided regions could be restrained, improving the transmission rate by 3%. In addition, the optical head device could be fabricated at a low cost since the optical head device could be activated by a smaller number of external signal sources than the conventional device.

EXAMPLE 3

The optical head device according to this example includes a phase correcting element for correcting two types of aberration of spherical aberration caused by a thickness variation of an optical disc and coma aberration caused by a tilt of an optical disc. The phase correcting element was incorporated as the phase correcting element 4 of the optical head device of FIG. 1. However, the phase correcting element control circuit 10 was modified for the phase correcting element of this example.

The element structure of the phase correcting element of this example is the same as the one shown in FIG. 2, and only the electrode pattern and the material thereof are different as stated below.

With regard to the electrode 24a of FIG. 2, an electrode pattern similar to the Example 2 shown in FIG. 13 can be provided, correcting the spherical aberration. In this example, a GZO film was employed as the material for the single transparent and continuous electrode 80 of FIG. 13, and chromium is employed in the metal electrodes 81–83. The metal electrodes 81, 82 are annular members and are concentrically provided each other. The value of the sheet resistance of the GZO film is 100 kΩ/□, and the value of the sheet resistance of chromium is 1 Ω/□.

Figure 15:
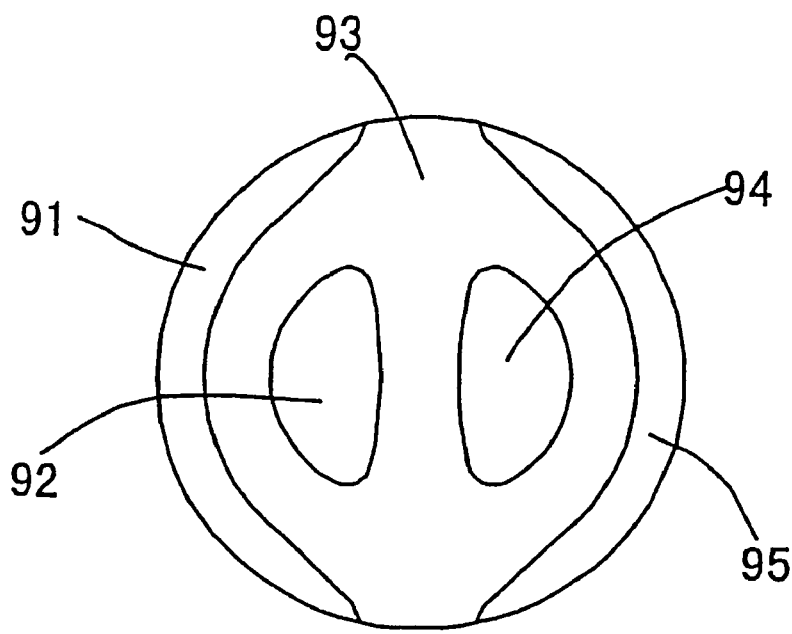
FIG. 15 is a schematic view showing the electrode pattern of the phase correcting element according to the third or a sixth Example.

On the other hand, with respect to the electrode 24b, divided electrodes 91–95 can be provided as shown in FIG. 15 to correct the comma aberration. The divided electrodes of FIG. 15 were provided by depositing an ITO film on a glass substrate by a sputtering method and patterning the deposited film by use of photolithographic and etching techniques. The thick lines in FIG. 15 indicate the gaps between divided electrodes, and no voltage was applied to the gaps since the ITO film has been removed therefrom by an etching technique. The gaps between divided electrodes had a width of 5 μm.

Now, the principle that the phase correcting element according to this example corrects the spherical aberration and the coma aberration will be explained. In this example, rectangular ac wave signals having a frequency of 1 kHz and a duty ratio of 1/2 were applied as signals to be inputted into the divided electrodes 91– 95 and the metal electrodes 81–83. Although the ac signals in a group of the divided electrodes 91–95 are in phase and the ac signals in a group of metal electrodes 81–83 were in phase, the ac signals in the group of the divided electrodes 91–95 and the ac signals in the group of the metal electrodes 81–83 are out of phase at an angle of 180°.

In this example, if the metal electrodes 81–83 are set at a voltage of $V_n(M)$ (n=1–3) with respect to the common voltage (e.g., 0V) of the phase correcting element control circuit, and if the divided electrodes 91–95 are set at a voltage of $V_m(D)$ (m=1–5) with respect to the common voltage, there are established a relationship of $V_n(M)>0$ and $V_m(D)<0$ at a moment and a relationship of $V_n(M)<0$ and $V_m(D)>0$ at another moment since the phases of the voltages to the divided electrodes and the metal electrodes are shifted by an angle of 180°. Thus, the effective voltage $V_{nm}(E)$ for driving the liquid crystal molecules is expressed as $[V_n(M)-V_m(D)]_{rms}$, i.e., the rms value (square root of the timewise mean of the square of an amplitude) of the difference between $V_n(M)$ and $V_m(D)$, wherein n=1–3 and m=1–5.

The effective voltage $V_{nm}(E)$ merely conforms to the absolute value of the difference, $|V_n(M)-V_m(D)|$, since this example has the rectangular ac waves having a frequency and a duty ratio of 1/2, and shifted by an angle of 180°. The voltages $V_n(M)$, $V_m(D)$ to be applied vary according to an aberration distribution to corrected.

First, in the case of correcting only the spherical aberration, the divided electrodes 91–95 for correcting the coma aberration had a fixed voltage, $V_m(D)=1V$ (m=1–5) in this example, applied thereto. The metal electrodes 81–83 for correcting the spherical aberration had a fixed voltage applied thereto, and the metal electrode 82 had a voltage applied to correspond to the thickness variation of an optical disc, the voltages of $V_n(M)=1V$ (n=1,3) and $V_2(M)=$ 0.5–1.5V being applied in this example.

Accordingly, the effective voltage $V_{nm}(E)$ was constantly 2 $V_{rms}$ at the metal electrodes 81, 83 and varied in a range of 1.5–2.5V at the metal electrode 81 according to the magnitude of thickness variations of an optical disc. As a result, the continuous potential distribution caused between the metal electrodes as in the Example 2 could continuously change the effective voltage, providing a phase change as shown in FIG. 14.

Next, in the case of correcting only the coma aberration, the metal electrode $V_n(M)$ (n=1–3) for correcting the spherical aberration had a fixed voltage of 1V applied thereto, and the divided electrode 93 for correcting the coma aberration had a fixed voltage of 1V applied thereto conversely to the case stated just above. A group of the divided electrodes 91, 94 and a group of the divided electrodes 92, 95, respectively, had a voltage and another voltage between 0.5–1.5V applied thereto according to the tilt amount of an optical disc so that the relationship of $(V_1(D)+V_2(D))/2=V_3(D)$ was satisfied. Even if the subscripts 1 and 2 are, respectively, replaced by 4 and 5, this relationship can be established.

Accordingly, the effective voltage $V_{nm}(E)$ is constantly 2 $V_{rms}$ at the divided electrode 93 and varies in a range of 1.5–2.5V at the divided electrodes 91, 92, 94, 95 according to the tilt amount of the optical disc. As a result, a potential distribution equal to the electrode pattern shown in FIG. 15 could be produced, obtaining a phase change accordingly.

Now, the case wherein the spherical aberration and the coma aberration are concurrently corrected will be explained. In this case, the divided electrode 93 and the metal electrodes 81, 83 have a fixed voltage of 1V applied thereto, the divided electrodes 91, 92, 94, 95 have a voltage in a range of 0.5–1.5V applied thereto according to the tilt amount of an optical disc, and the metal electrode 82 has a voltage in a range of 0.5–1.5V applied thereto according to the magnitude of thickness variations of the optical disc. Thus, a potential distribution is produced according to the amount of the coma aberration and the amount of the spherical aberration as in the cases stated earlier.

Since the liquid crystal changes the effective refractive index in response to voltages, the refractive index rate distribution is provided according to the potential distribution to change the phase of the light passing through the phase correcting element.

Thus, even if an optical disc having a thickness variation was tilted, both spherical aberration and coma aberration could be concurrently corrected to obtain excellent reproduced signals.

Although the electrode for correcting the coma aberration was divided electrodes in the case stated just above, a single continuous electrode for coma aberration may be have metal electrodes as the power supply electrodes as in the Example 1 unlike the case stated just above, and the electrode for spherical aberration may be divided electrodes, which are concentrically divided.

In addition, an electrode pattern for correcting coma aberration in a radial direction of an optical disc and an electrode pattern for correcting coma aberration in a tangential direction of the optical disc may be paired, and electrode patterns for correcting spherical aberration and astigmatism or electrode patterns for correcting coma aberration and astigmatism may be paired. In either case, two kinds of aberration or wave front changes can be concurrently corrected.

As explained, the optical head device according to this example could be employed to concurrently correct both coma aberration caused by the tilt of the optical disc and spherical aberration caused by the thickness variation of the optical disc. In addition, in comparison with the conventional phase correcting element with the electrodes divided, the light scattering in divided regions could be restrained, improving the transmission rate by 5%. Further, the optical head device could be fabricated at a low cost since the optical head device could be activated by a smaller number of external signal sources than the conventional device.

EXAMPLE 4

The optical head device according to this example includes a phase correcting element for correcting spherical aberration caused by a variation in the thickness of an optical disc. The phase correcting element was incorporated as the phase correcting element 4 of the optical head device of FIG. 1. However, the phase correcting element control circuit 10 was modified for the phase correcting element of this example.

Figure 16:
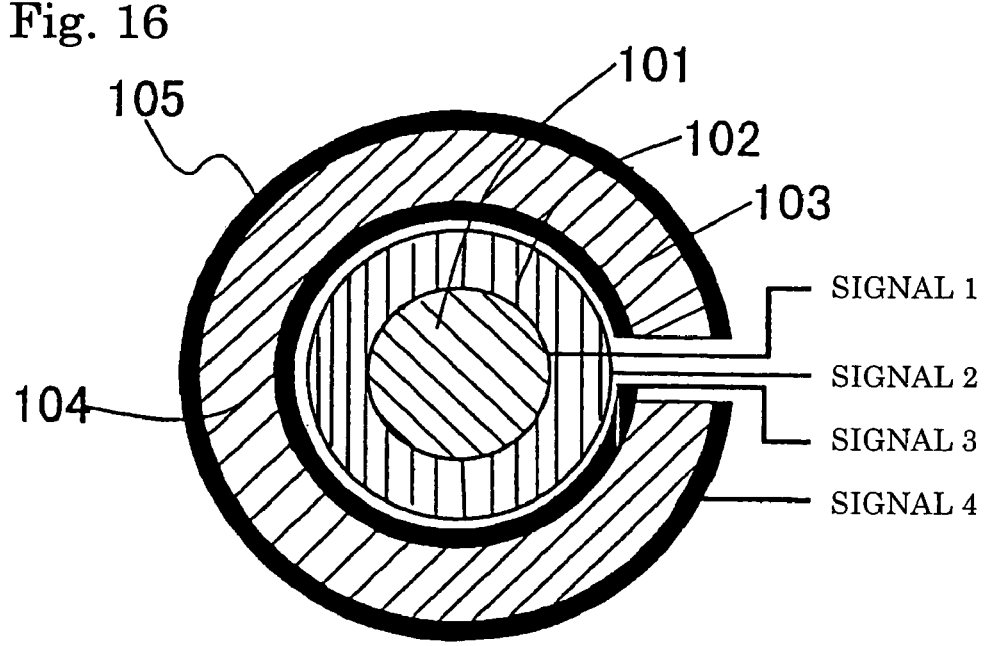
FIG. 16 is a schematic view showing the electrode pattern of the phase correcting element according to a fourth Example.

The element structure of the phase correcting element of this example is the same as the one shown in FIG. 2, and only the electrode pattern thereof is different as stated below. With regard to the preparation method and the structural material for the phase correcting element, the same method and the material as the ones in the Example 1 were used. The electrode 24a in FIG. 2 comprises divided electrodes 101, 102, 103 and power supply electrodes 104, 105 provided on the divided electrode 103 as shown in FIG. 16. The material of the divided electrodes 101–103 is a GZS film, and the material of the power supply electrodes 104, 105 is an ITO film. The sheet resistance of the GZS and ITO were set at 1000 kΩ/□ and 10 kΩ/□, respectively.

The electrode 24a was provided by depositing an ITO film on a glass substrate by a sputtering method and forming the power supply electrodes 104, 105 by use of photolithographic and etching techniques at a first step. Next, the divided electrodes 101, 103 were provided by depositing an ITO film by a sputtering method and dealing with the ITO film by photolithographic and etching techniques as in the first step. The distance between divided electrodes was set at 5 μm as in the Example 3.

The signals 1–4 in FIG. 16 are, respectively, signals to be applied to the divided electrodes 101, 102, and the power supply electrodes 104, 105, which were generated by the phase correcting element control circuit 10. Although it is shown in FIG. 16 that the wire for the signal 1 appears to extend in the divided electrode 102, the divided electrode 102 was patterned in this example so that both of the wire and the divided electrode were insulated by etching treatment.

On the other hand, the electrode 24b in FIG. 2 was provided as a single continuous electrode, which was made of an ITO film.

Next, the principle that the phase correcting element of this example corrects the spherical aberration will be explained. In this example, signals to be applied are rectangular ac wave signals having a frequency of 1 kHz and a duty ratio of 1/2, and the signals are in phase with respect to all of the divided electrodes 101, 102 and the power supply electrodes 104, 105. The opposed electrode 24b is fixed at the common voltage (e.g., 0V) of the phase correcting element control circuit.

When no spherical aberration was caused, the voltages of the signals 1–4 were all set at 2V. Thus, the electrode 24a is at an equal potential of 2V, causing no phase change.

Now, when a thickness variation of an optical disc caused spherical aberration, the voltages $V_1$, $V_4$ of the signal 1 and the signal 4 were fixed at 2V, and the voltages $V_2$, $V_3$ of the signal 2 and the signal 3 were set at values in a range of 1–3V according to magnitudes of the thickness variation. The relationship of $V_1$–$V_4$ was determined so as to meet the conditions of $(V_2-V_1)=\alpha \cdot (V_3-V_1)$ and $V_1=V_4$. In the conditions, α is a proportional constant satisfying the relation of 0<α<1 and is determined by the diameters of the divided electrode 101 and the power supply electrode 104. In this example, in the case of α=0.5, the reproduced signals from an optical disc was obtained most effectively. In the case of correcting the spherical aberration, the relationship of $V_1=V_4$ is not needed, and application of different voltages as $V_1$ and $V_4$ can correct the wave front aberration better, obtaining reproduced signals, effectively in some cases.

The entire potential distribution of the phase correcting element thus produced exhibits a stepwise distribution with the potentials in the divided electrodes 101, 102 being constant and the potential in the divided electrode 103 continuously varied. The phase change thus produced could cause the spherical aberration to be corrected, obtaining reproduced signals effectively with respect to an optical disc having a thickness variation as well.

As explained, the optical head device in this example could be fabricated at a low cost since the optical head device could be activated by a smaller number of external signal sources than the conventional device.

Since one of the divided electrodes was prepared to have the plural power supplied portions to decrease the number of the divided electrodes in comparison with the conventional phase correcting element, the light scattering in the divided regions was reduced, including the transmission rate by 3%.

EXAMPLE 5

The optical head device according to this example includes a phase correcting element for correcting the spherical aberration caused by variations in the thickness of an optical disc. When an optical disc has a thickness deviated from a design value, the objective lens produces the spherical aberration, lowering reading precision for signals. The phase correcting element for correcting the spherical aberration was incorporated as the phase correcting element 4 of the optical head device in FIG. 1. However, the phase correcting element control circuit 10 was modified for the phase correcting element of this example.

The element structure of the phase correcting element of this example is the same as the one shown in FIG. 2. The principle that the phase correcting element of this example corrects the spherical aberration will be explained. In the optical head device of this example, the objective lens had an NA of 0.95, and the light source had a wavelength of 0.4 μm. The wave front aberration (spherical aberration) that is caused when the thickness of an optical disc is greater than a design value of 0.6 mm by 0.03 mm is shown in FIG. 3 as stated earlier. The electrode pattern of the phase correcting element of this example is the one shown in FIG. 7, and an equivalent circuit thereof is the one shown in FIG. 8.

The hatched portion in FIG. 7 indicates a transparent electrode 40 made of a GZO film, and the thick lines (annular members) are power supply electrodes 41, 42, 43, 44 provided by etching a thin film of chromium. The power supply electrodes are connected to signals 1,2 as external signal sources through wires, which are made of the thin film of chromium deposited on the same substrate as the power supply electrodes. The power supply electrode 42 is connected to the signal 1 through a thin film resistor 45, which is provided on the same substrate.

The power supply electrodes 41–44 had a width of 100 µm, the power supply electrodes 42, 43, 44 had diameters of 0.5 mm, 1.5 mm and 2.2 mm, respectively, and the power supply electrode 41 had a circular shape having a diameter of 50 µm. The patterns of the electrode and the power supply electrodes were formed as stated below. First, a film of chromium was deposited on a glass substrate by a sputtering method, and then unnecessary portions were removed by an etching technique to form the power supply electrodes and the wires. Next, an ITO film was deposited on a sputtering method, and then the thin film resistor 45 was formed by an etching technique. After that, an GZO film was deposited by a sputtering method, and the transparent electrode 40 was formed by an etching technique.

With respect to the value of sheet resistance of the respective portions, the power supply electrodes had 1 Ω/□, the electrode had 100 kΩ/□, and the thin film resistor had 300 Ω/□. The values of resistance of the electrode between power supply electrodes corresponding to the resistors $R_1$, $R_2$, $R_3$ in FIG. 8 were 50 kΩ, 28 kΩ and 20 kΩ, respectively. The value of resistance and the shape of the thin film resistor were determined as stated below. In order to set the potential of the power supply electrode 42 corresponding to the point 47 in FIG. 8 at about 2.15 V when the potentials of the power supply electrodes 41, 44 were set at $V_1=2V$ by the signal 1 and when the potential of the power supply electrode 43 is set at $V_2=3V$ by the signal 2, the relationship of $R_S=5.48$ kΩ may be established according to the equation (1). Accordingly, if the thin film resistor has a line width W of 30 µm, the length L is about 0.55 mm according to the relationship of $R_S=\rho_L \times L/W$ since the sheet resistance $\rho_L$ is 300 Ω/□. In this example, the thin film resistor (linear resistor) having a value of resistance of 5.48 kΩ was formed in such a shape that a wire having a width of 30 µm and a length of 0.55 mm was bent at three portions.

In order to use the phase correcting element to correct the spherical aberration caused by the thickness variation of an optical disc in the amount of 0.03 mm, a voltage of 2.3V was supplied to the power supply electrodes 41, 44, and a voltage of 2.0V was supplied to the power supply electrode 43. As a result, a voltage of about 2.05V was supplied to the supply power portion 42 by the thick film resistor. In this example, the electrode that is opposed to the electrode with the power supply electrodes shown in FIG. 7 comprises a single transparent electrode with one power supply electrode and is constantly at a potential of 0V.

In FIG. 14, the phase change caused by the phase correcting element is shown in nm. It was the same as the one in the Example 2. If the phase change in a central portion of the circles and the phase change in a peripheral portion thereof are 0 nm, the phase change in an intermediate region is about −100 nm. In this figure, the plural circles of solid lines indicate contour lines, each of which indicates 20 nm in the intermediate region of −100 nm and about 30 nm outside that region.

The transparent electrode 40 (see FIG. 7) has a voltage distribution produced according to the voltages of the power supply electrodes. As stated earlier, a substantial refractive index distribution is produced in the liquid crystal by the voltage distribution in the transparent electrode 40 of FIG. 7, causing the phase correcting element to produce the phase change in a concentric form shown in FIG. 14.

On the other hand, in order to correct the spherical aberration wherein the positive and negative signs in FIG. 14 are reversed when an optical disc has a smaller thickness by 0.03 mm, a voltage of 2.0V can be supplied to the power supply electrodes 41, 44, and a voltage of 2.3V can be supplied to the power supply electrode 43 to cancel the spherical aberration since the phase change produced by the phase correcting element has a form wherein the positive and negative signs in FIG. 14 are reversed. As explained, the thin film resistor 45 can be provided to obtain a desired voltage, and proper voltages can be supplied to the power supply electrodes 41, 43, 44, correcting the spherical aberration of FIG. 14.

EXAMPLE 6

The optical head device according to this example includes a phase correcting element for correcting both the spherical aberration caused by thickness variations of an optical disc and the coma aberration caused by tilts of the optical disc. This phase correcting element was incorporated as the phase correcting element 4 of the optical head device of FIG. 1. However, the phase correcting element control circuit 10 was modified for the phase correcting element of this example. The element structure of the phase correcting element of this example is the same as one shown in FIG. 2, and only the electrode pattern and the material are different as stated below.

Figure 17:
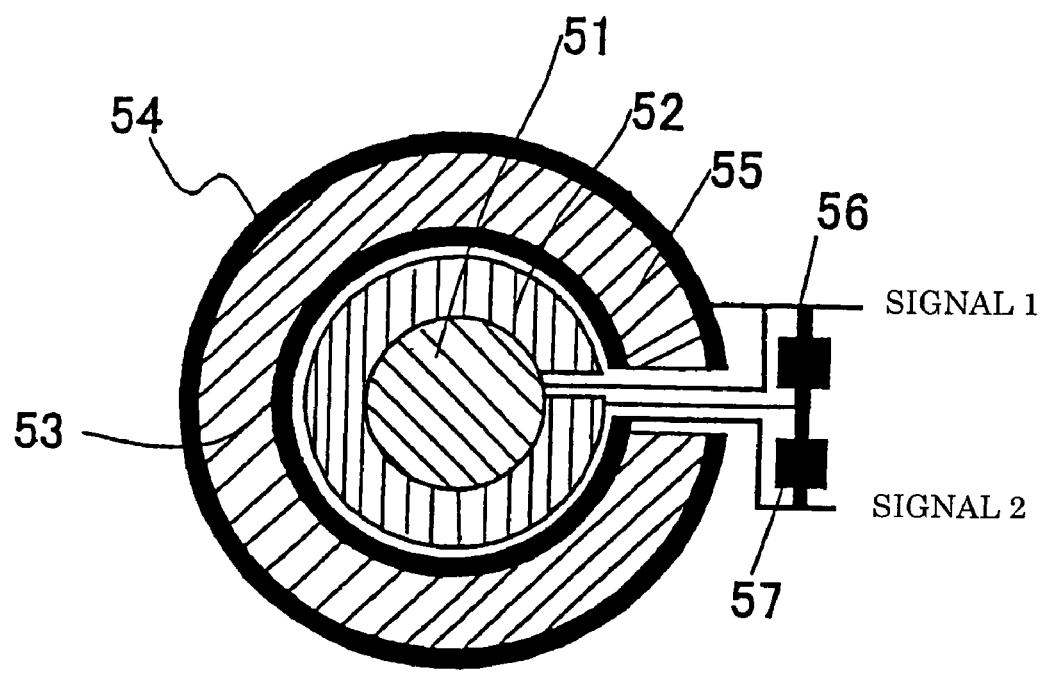
FIG. 17 is a schematic plan view showing one electrode pattern of the phase correcting element according to the sixth Example.

The electrode 24a of FIG. 2 comprises divided electrodes 51, 52, 55, power supply electrodes 53, 54 provided on the divided electrode 55, and thin film resistors 56, 57 as shown in FIG. 17. In FIG. 17, the thin film resistors 56, 57 are schematically shown, and the resistors are actually formed in a linear shape or another shape to obtain a desired value of resistance.

The material of the divided electrodes 51, 52, 55 was a GZS film, and the materials of the power supply electrodes 53, 54 and the thin film resistors 56, 57 were an ITO film. The GZS film and the ITO film had a sheet resistance of 1000 Ω/□ and a sheet resistance of 10 kΩ/□, respectively. The electrode 24a was provided by depositing the ITO film on a glass substrate by a sputtering method and forming the power supply electrodes 53, 54 and the thin film resistors 56, 57 by photolithographic and etching techniques at a first step. The power supply electrodes 53, 54 had a width of 50 µm. Next, the GZS film was deposited by a sputtering method, and the divided electrodes 51, 52, 55 were formed by photolithographic and etching techniques. The distance between divided electrodes was set at 5 µm. The signals 1 and 2 in FIG. 17 are signals to be applied to the divided electrode 51 and the power supply electrode 54, and the power supply electrode 53, respectively, which are produced by the phase correcting element control circuit 10.

On the other hand, the electrode 24b can have divided electrodes 91–95 provided as shown in FIG. 15 and as in the Example 3 to correct the coma aberration. The divided electrodes in FIG. 15 were provided by depositing an ITO film on a glass substrate by a sputtering method and patterning the film by photolithographic and etching techniques. The thick lines in FIG. 15 indicate gaps between divided electrodes, where the ITO film is removed by etching, and no voltage is applied. The gaps between divided electrodes had a width of 5 µm.

Now, the principle that the phase correcting element of this example corrects the spherical aberration and the coma aberration will be explained. The output waveforms from the phase correcting element control circuit are rectangular ac wave signals having a frequency of 1 kHz and a duty ratio of 1/2, the ac signals in the electrode 24a are in phase, the ac signals in the electrode 24b are in phase, and the electrode 24a is in opposite phase with the electrode 24b (a phase difference of 180°).

In this example, if the divided electrodes and the power supply electrodes on the electrode 24a are set at a voltage of $V_n(S)$ (n=1–4) with respect to the common voltage (e.g., 0V) of the phase correcting element control circuit, and if the divided electrodes on the electrode 24b are set at a voltage of $V_m(D)$ (m=1–5) with respect to the common voltage, there is established a relationship of $V_n(S)>0$ and $V_m(D)<0$ at a moment and a relationship of $V_n(S)<0$ and $V_m(D)>0$ at another opposed moment since the phases of the voltages to both electrodes are shifted by an angle of 180°. Thus, the effective voltage $V_{nm}(E)$ for driving the liquid crystal molecules 28 is expressed as $[V_n(S)-V_m(D)]_{rms}$, i.e., the rms value (square root of the timewise mean of the square of an amplitude) of the difference between $V_n(S)$ and $V_m(D)$.

The effective voltage $V_{nm}(E)$ merely conforms to the absolute value of the difference, $|V_n(S)-V_m(D)|$, since this example has the rectangular ac waves having a duty ratio of 1/2 and shifted by an angle of 180° C. The voltages $V_n(S)$, $V_m(D)$ to be applied vary according to an aberration distribution to be corrected.

First, in the case of correcting only the spherical aberration, a fixed voltage is applied to the divided electrodes 91–95 for correcting the coma aberration. In this case, the voltage of $V_m(D)=1V$ (m=1–5) was applied. With regard to the electrode 24a for correcting the spherical aberration, a fixed voltage of $V_n(S)=1V$ (n=1,4) as a signal 1 was applied to the divided electrode 51 and the power supply electrode 54, and a voltage of $V_n(S)=0.5-1.5V$ (n=2,3) was applied to the divided electrode 52 and the power supply electrode 53 to provide a voltage corresponding to the thickness variation of an optical disc. As a result, the effective voltage $V_{nm}(E)$ is constantly $2V_{rms}$ at the divided electrode 51 and the power supply electrode 54, and varies in a range of $1.5-2.5V_{rms}$ at the divided electrode 52 and the power supply electrode 53 according to the thickness variation of the optical disc. Thus, the effective voltage can be continuously varied by the continuous potential distribution caused between the metal electrodes as in the Example 5, obtaining a phase change according to the electrode pattern.

Next, in the case of correcting only the coma aberration, the signals 1, 2 were set at a fixed voltage, and a voltage of $V_n(S)$ (n=1–4)=1V was applied to the divided electrodes and the power supply electrodes with respect to the electrode 24a for correcting the spherical aberration conversely to the case stated just above. On the other hand, with respect to the electrode 24b for correcting the coma aberration, a fixed voltage of 1V was applied to the divided electrode 93. With regard to the electrodes 91 and 94, 92 and 95, a voltage in a range of 0.5–1.5V was equally applied to each of the paired electrodes according to the tilt amount of an optical disc so as to satisfy the relationship of $(V_1(D)+V_2(D))/2=V_3(D)$.

Thus, the effective voltage $V_{nm}(E)$ is constantly $2V_{rms}$ at the divided electrode 93 and varies in a range of $1.5-2.5V_{rms}$ at the divided electrodes 91, 92, 94, 95 according to the tilt amount of the optical disc. As a result, the potential distribution was produced in a form equal to the electrode pattern shown in FIG. 15, obtaining the required phase change.

Next, the case of concurrently correcting the spherical aberration and the coma aberration will be explained. In this case, a fixed voltage of 1V was applied to the divided electrode 93, the divided electrode 51 and the power supply electrode 54, a voltage in a range of 0.5–1.5V is applied to the divided electrodes 91, 92, 94, 95 according to the tilt amount of an optical disc, and a voltage in a range of 0.5–1.5V was applied as the voltage for the signals 1 and 2 in FIG. 17 according to the thickness variation of the optical disc. Thus, the potential distribution is produced according to the coma aberration and the spherical aberration as in the cases stated earlier. As a result, even if an optical disc having a thickness variation was tilted, the spherical aberration and the coma aberration could be corrected as the result of the required phase change, obtaining reproduced signals effectively.

Although the electrode for correcting the coma aberration was formed as divided electrodes in the case stated just above, the electrode for correcting the coma aberration may be metal electrodes as the power supply electrodes, and the electrode for correcting the spherical aberration may be divided electrodes, which are concentrically divided, as in the Example 5. In addition, an electrode pattern for correcting radial coma aberration and an electrode pattern for correcting tangential coma may be provided on the respective substrates so as to be paired, and electrode patterns for correcting the spherical aberration and the astigmatism or electrode patterns for correcting the coma aberration and the astigmatism may be paired. In either case, two kinds of aberration or wave front changes can be concurrently corrected.

INDUSTRIAL APPLICABILITY

As explained, the optical head device according to the present invention can effectively correct the wave front aberration caused by the tilt of an optical disc, a thickness variation thereof or another factor to obtain excellent signal light with noise minimized since two or more supply portions can be provided on at least one of electrodes formed on the paired substrates forming the phase correcting element, producing a continuous phase (wave front) change in outgoing light from the light source by this phase correcting element.

In addition, plural power supply electrodes can be electrically connected through the thin film resistor to perform an equivalent aberration correcting function by a smaller number of signal sources than the conventional device.

In addition, even if a shift in the objective lens is caused in a radial direction of an optical recording medium, the wave front aberration (mainly the coma aberration) can be corrected without driving the phase correcting element integrally with the objective lens. In addition, the spherical aberration caused by the thickness variation in an optical disc can be corrected.

Even if the electrode provided on a substrate comprises a single continuous electrode or is divided into plural sections, the advantages offered by the present invention are not greatly different as long as the requirements for the present invention are satisfied.

The invention claimed is:

1. An optical head device comprising:
   a light source;
   an objective lens for converging outgoing light from the light source on an optical recording medium;
   a phase correcting element provided between the light source and the objective lens to change a wave front of the outgoing light, the phase correcting element including an anisotropic optical medium sandwiched between a pair of substrates, at least one of the substrates being transparent, the paired substrates having surfaces provided with electrodes for voltage application to the anisotropic optical medium, the electrode on at least one of the substrates having a plurality of power supply electrodes provided thereon at different positions, thereby providing different voltages to the electrodes; and a control voltage generator for outputting a voltage for changing the wave front to the phase correcting element.

2. The optical head device according to claim 1, wherein only one of the paired substrates is a transparent substrate.

3. The optical head device according to claim 1, wherein the anisotropic optical medium is a liquid crystal.

4. The optical head device according to claim 1, wherein an electrode material forming the electrodes with the power supply electrodes has a sheet resistance of not less than 100/□.

5. The optical head device according to claim 4, wherein the electrode material comprises one of a zinc oxide layer with gallium added thereto and a zinc oxide layer with gallium and silicon added thereto.

6. The optical head device according to claim 1, wherein each electrode material forming the electrodes has a sheet resistance of not less than 1000 times a sheet resistance of a power supply electrode material forming the power supply electrodes.

7. The optical head device according to claim 6, wherein the electrode material comprises one of a zinc oxide layer with gallium added thereto and a zinc oxide layer with gallium and silicon added thereto.

8. An optical head device comprising:
a light source;
an objective lens for converging outgoing light from the light source on an optical recording medium;
a phase correcting element provided between the light source and the objective lens to change a wave front of the outgoing light, the phase correcting element including an anisotropic optical medium sandwiched between a pair of substrates, the paired substrates having respective opposed surfaces provided with electrodes for voltage application to the anisotropic optical medium, the electrode on at least one of the substrates having a plurality of power supply electrodes provided thereon at different positions, not less than two of the plural power supply electrodes being conductively connected together through a thin film resistor comprising a conductive thin film; and
a control voltage generator for outputting a voltage for changing the wave front to the phase correcting element.

9. The optical head device according to claim 8, wherein an electrode with the power supply electrodes provided thereon is divided into a plurality of divided electrodes, the respective divided electrodes have more than one power supply electrode provided thereon, and not less than two of the power supply electrodes are conductively connected together through the thin film resistor.

10. The optical head device according to claim 8, wherein only one of the paired substrates is a transparent substrate.

11. The optical head device according to claim 8, wherein the anisotropic optical medium is a liquid crystal.

12. The optical head device according to claim 8, wherein an electrode material forming the electrodes with the power supply electrodes has a sheet resistance of not less than 100/□.

13. The optical head device according to claim 12, wherein the electrode material comprises one of a zinc oxide layer with gallium added thereto and a zinc oxide layer with gallium and silicon added thereto.

14. The optical head device according to claim 8, wherein all thin film resistors have a value of resistance in a range from 100 to 1000 k.

15. The optical head device according to claim 8, wherein each electrode material forming the electrodes has a sheet resistance of not less than 1000 times a sheet resistance of a power supply electrode material forming the power supply electrodes.

16. The optical head device according to claim 15, wherein the electrode material comprises one of a zinc oxide layer with gallium added thereto and a zinc oxide layer with gallium and silicon added thereto.

17. An optical head device comprising:
a light source;
an objective lens for converging outgoing light from the light source on an optical recording medium;
a phase correcting element provided between the light source and the objective lens to change a wave front of the outgoing light, the phase correcting element including an anisotropic optical medium sandwiched between a pair of substrates, at least one of the substrates being transparent, the paired substrates having surfaces provided with electrodes for voltage application to the anisotropic optical medium, the electrode on at least one of the substrates having a plurality of power supply electrodes provided thereon at different positions, thereby providing different voltages to the plural power supply electrodes; and
a control voltage generator for outputting a voltage for changing the wave front to the phase correcting element, wherein the plural power supply electrodes are annular members and are concentrically provided each other, a first of the annular members has a radius ratio of 0.65–0.85 to luminous flux of the outgoing light starting from the light source and passing through the phase correcting element, and a second of the annular members has a radius ratio of 0.2–0.4 to the luminous flux.

18. An optical head device comprising:
a light source;
an objective lens for converging outgoing light from the light source on an optical recording medium;
a phase correcting element provided between the light source and the objective lens to change a wave front of the outgoing light, the phase correcting element including an anisotropic optical medium sandwiched between a pair of substrates, the paired substrates having respective opposed surfaces provided with electrodes for voltage application to the anisotropic optical medium, the electrode on at least one of the substrates having a plurality of power supply electrodes provided thereon at different positions, not less than two of the plural power supply electrodes being conductively connected together through a thin film resistor comprising a conductive thin film; and
a control voltage generator for outputting a voltage for changing the wave front to the phase correcting element, wherein the plural power supply electrodes are annular members and are concentrically provided each other, a first of the annular members has a radius ratio of 0.65–0.85 to luminous flux of the outgoing light starting from the light source and passing through the phase correcting element, and a second of the annular member has a radius ratio of 0.2–0.4 to the luminous flux.

* * * * *